United States Patent
Suzuki et al.

(10) Patent No.: US 6,384,752 B1
(45) Date of Patent: May 7, 2002

(54) ABSOLUTE ENCODER

(75) Inventors: Koji Suzuki; Masamichi Inenaga, both of Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/744,307

(22) PCT Filed: Jul. 22, 1999

(86) PCT No.: PCT/JP99/03935

§ 371 Date: Jan. 23, 2001

§ 102(e) Date: Jan. 23, 2001

(87) PCT Pub. No.: WO00/05553

PCT Pub. Date: Feb. 3, 2000

(30) Foreign Application Priority Data

Jul. 23, 1998 (JP) ............................................ 10-208185

(51) Int. Cl.⁷ ................................................ H03M 1/48
(52) U.S. Cl. .............. 341/111; 250/231.14; 250/231.18
(58) Field of Search ................................. 341/111, 155, 341/144, 142; 250/231.18, 231.14; 327/159; 318/654; 375/283

(56) References Cited

U.S. PATENT DOCUMENTS

| | | | | |
|---|---|---|---|---|
| 4,092,491 A | * | 5/1978 | Frazer ........................... | 375/283 |
| 5,005,016 A | * | 4/1991 | Schmidt et al. .............. | 341/111 |
| 5,068,529 A | * | 11/1991 | Ohno et al. ............. | 250/231.18 |
| 5,329,216 A | * | 7/1994 | Hasegawa et al. ........... | 318/654 |
| 5,438,193 A | * | 8/1995 | Takagi et al. ........... | 250/231.18 |
| 5,442,315 A | * | 8/1995 | Hutchins ..................... | 327/159 |
| 5,563,408 A | * | 10/1996 | Matsumoto et al. ... | 250/231.14 |

FOREIGN PATENT DOCUMENTS

| | | | |
|---|---|---|---|
| JP | 59-132308 | 7/1984 | ............ G01D/5/12 |
| JP | 59-157544 | 10/1984 | ........... F02B/77/08 |
| JP | 8-61982 | 3/1996 | ........... G01D/5/249 |

OTHER PUBLICATIONS

International Search Report.

* cited by examiner

*Primary Examiner*—Peguy JeanPierre
*Assistant Examiner*—Jean Bruner JeanGlaude
(74) *Attorney, Agent, or Firm*—Sughrue Mion, PLLC

(57) ABSTRACT

An absolute encoder that can generate an absolute value signal by performing simple operation processing. Phase signals $\phi 0$ to $\phi 3$ are represented by j-bit digital signals, a signal b provided by dividing the phase signal $\phi 0$ by $2^{K1}$ (where K1 is an integer) is subtracted from a phase difference signal $\phi 01=c$, an absolute value signal A01=f of the number of pitches (a0–a1) with a signal of the high-order K1 bits of the signal provided by subtracting the signal from $\phi 01$ as high-order bits and $\phi 0$ as low-order bits, subsequently a signal g provided by dividing the phase signal A01=f by $2^{K2}$ (where K2 is an integer) is subtracted from a phase difference signal $\phi 02=h$, an absolute value signal A02=k of the number of pitches (a0–a2) with a signal of the high-order K2 bits of the signal provided by subtracting the signal from $\phi 02$ as high-order bits and f as low-order bits, and the process is executed in order, whereby a longer-pitch absolute value signal is generated and signals are processed in order from the shorter-pitch signals to the longer-pitch signals, whereby the condition under which the pitch number cannot be determined is eliminated, and a large allowance of a phase error between slits can be taken. An error of a phase difference signal at the high-speed scale rotation time can also be corrected and adjusted by PLL.

5 Claims, 17 Drawing Sheets

PHASE MARGIN

DISPLAY COMPRESSION BETWEEN ANGLE DESPLACEMENTS BETWEEN SENSOR AND SCALE

ONE ROTATION

ANGLE DISPLACMENTS BETWEEN SENSOR AND SCALE

WAVEFORM CHART BEFORE ADJUSTMENT

WAVEFORM CHART AFTER ADJUSTMENT

ABSOLUTE ENCODER

TECHNICAL FIELD

This invention relates to a vernier-type absolute encoder and in particular to a vernier-type absolute encoder concerning signal processing in absolute value signal generation and input signals (phase signal and phase difference signal) and in particular to an absolute encoder hard to be affected by a phase error between slit strings caused by distortion of a detection waveform or the like in simple operation processing and adaptable to high-speed rotation.

BACKGROUND OF THE INVENTION

In general, a vernier-type absolute encoder in a related art generates phase difference signals from two pairs of phase signals, determines the pitch number of a shorter-pitch phase difference signal from a longer-pitch phase difference signal, repeats this process in order, and last determines the pitch number of the phase signal of the largest number of pitches.

FIG. 13 is a schematic representation of the operation of an absolute encoder in a related art. As shown here, if the pitch length of a phase difference signal is 4:1, the relation between phase predicted value $\phi b'$ and pitch number predicted value N of a short-pitch phase difference signal in phase $\phi a$ of a long-pitch phase difference signal is $$\phi b' = 4\phi a - 2N\pi$$

where N is found as a value of $0 < \phi b' < 2\pi$ among 0, 1, 2, and 3.

Next, the pitch number is determined from $\phi b$ actually obtained.

If the pitch number predicted value is 1 and $\phi b' < \pi$ as in FIG. 13, (1) when $0 < \phi b < \phi b' + \pi$, the pitch number is determined 1 equal to the predicted value; or (2) when $\phi b' + \pi < \phi b < 2\pi$, the pitch number is determined 0 resulting from subtracting 1 from the predicted value.

In such a method, if the phase error between the signals is, in the example, theoretically within $\pm \pi/4$ (which becomes ½ resulting from dividing $2\pi$ by pitch rate 4) in terms of angle represented by the phase angle of $\phi a$, the pitch number can be determined correctly.

In fact, the following processing is performed for the digital phase difference signals:

Letting $\phi a$ and $\phi b$ be a four-bit (t3, t2, t1, t0) signal and a four-bit (s3, s2, s1, s0) signal respectively, first a tentative pitch number (pitch number predicted value) is determined based on the high-order two bits of $\phi a$.

The tentative pitch number becomes as follows:

When the high-order two bits (t3, t2) of $\phi a$ are
(0, 0): 0
(0, 1): 1
(1, 0): 2
(1, 1): 3.

For example, if the bit string of $\phi a$, (t3, t2, t1, t0), is (0, 1, 0, 0), the pitch number predicted value becomes 1.

Next, the low-order two bits (t1, t0) of $\phi a$ are compared with the high-order two bits (s3, s2) of $\phi b$, whereby the tentative pitch number is corrected and the pitch number of $\phi b$ is determined finally.

The correction of the pitch number will be discussed by taking a case where the low-order two bits (t1, t0) of $\phi a$ are (0, 0) as an example.

If the high-order two bits (s3, s2) of $\phi b$ are (1) (0, 0) or (0, 1), the pitch number is determined 1 equal to the predicted value;

(2) (1, 1), the pitch number is determined 0 resulting from subtracting 1 from the predicted value. (3) However, if the high-order two bits are (1, 0), the error from the predicted value becomes equal when the pitch number 1 or 0, and the pitch number cannot be determined.

There is a possibility that the state of (3) will be entered if the phase error between $\phi a$ and $\phi b$ becomes equal to or greater than $\pi/8$ in terms of angle represented by the phase angle of $\phi a$; it is seen that the pitch number cannot be determined. In this example, the allowance of the phase error becomes a half that under an ideal condition.

However, in the above-described example in the related art, the following problem is involved: To determine the pitch number of a short-pitch phase difference signal from a long-pitch phase difference signal, a determination processing function of a computing element (microprocessor), etc., is required.

There is a condition under which the pitch number cannot be determined, thus the allowance of the phase error between the signals lessens.

If the number of bits involved in signal processing is few, the allowance of the phase error lessens; if the number of bits involved in processing is increased to grow the allowance of the phase error and bring the condition close to the ideal condition, operation processing becomes complicated. This is a problem.

It is therefore an object of the invention to provide a low-cost, high-reliability absolute encoder hard to be affected by a phase error between slit strings caused by distortion of a detection waveform or the like by performing simple operation processing without requiring a determination processing function of a computing element, etc.

DISCLOSURE OF THE INVENTION

To the end, according to an aspect of the invention, there is provided an absolute encoder comprising a scale having a plurality of tracks different in the number of pitches where position information repeated at the same pitches is formed, a plurality of sensors for making a relative move to the scale for detecting the position information, a phase modulation section for converting signals from the sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that when the phase signals $\phi 0, \phi 1, \phi 2, \phi 3 \ldots$ are j-bit digital signals represented as $\phi 0 = 2\pi a0x + b0$
$\phi 1 = 2\pi a1x + b1$
$\phi 2 = 2\pi a2x + b2$
$\phi 3 = 2\pi a3x + b3$
. . .

where a0, a1, a2, a3, . . . are each the number of pitches, x is relative displacement between scale and sensor, b0, b1, b2, b3, . . . are each an initial phase, the absolute value signal generation section sets the numbers of pitches a0, a1, a2, a3 . . . so that the number of pitches of phase difference signal $\phi 01$ between $\phi 0$ and $\phi 1$ (a0−a1), the number of pitches of phase difference signal $\phi 02$ between $\phi 0$ and $\phi 2$ (a0−a2), the number of pitches of phase difference signal $\phi 03$ between $\phi 0$ and $\phi 3$ (a0–a3)

. . .

become $a0/(a0-a1)=2^{K1}$
$(a0-a1)/(a0-a2)=2^{K2}$
$(a0-a2)/(a0-a3)=2^{K3}$

. . .

where k1, k2, k3 . . . are each an integer, an absolute value signal A01 of the number of pitches (a0–a1) can be generated in such a way that the high-order k1 bits of the signal A01 is that of the signal provided by subtracting the signal that is provided by dividing $\phi 0$ by $2^{K1}$ from $\phi 01$ whereas the low-order bits of the signal A01 is $\phi 0$. Next, an absolute value signal A02 of the number of pitches (a0–a2) can be generated in such a way that the high-order k2 bits of the signal A02 is that of the signal provided by subtracting the signal that is provided by dividing A01 by $2^{K2}$ from $\phi 02$ whereas the low-order bits is A01. Executing these processes in order can generate a longer-pitch absolute value signal.

Specifically, positions of the position information on the scale are formed or a phase adjustment circuit is provided so that a phase $\pi$ point of $\phi 0$ becomes a phase zero point of $\phi 01$, that a phase $\pi$ point of A01 becomes a phase zero point of $\phi 02$, and that a phase $\pi$ point of A02 becomes a phase zero point of $\phi 03$.

More specifically, the phase adjustment circuit inputs a phase adjustment signal into a shift register, generates a plurality of phase adjustment signals different in shift amount with that phase adjustment signal shifted in order based on an adjustment reference clock, selects each post-shifted phase adjustment signal by a multiplexer, generates a carrier wave from the selected signal, and inputs the carrier wave into phase modulation section for making a phase adjustment of the phase signal.

According to another aspect of the invention, there is provided an absolute encoder comprising a scale having a plurality of tracks different in the number of pitches where position information repeated at the same pitches is formed, a plurality of sensors for making a relative move to the scale for detecting the position information, a phase modulation section for converting signals from the sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that the digital conversion section inputs the phase signal into a PLL, (phase-locked loop) circuit, generates a clock whose frequency is changed in association with a period of the phase signal by the PLL circuit, and generates the phase difference signal based on the count of the clocks.

According to yet another aspect of the invention, there is provided an absolute encoder comprising a scale having a plurality of tracks different in the number of pitches where position information repeated at the same pitches is formed, a plurality of sensors for making a relative move to the scale for detecting the position information, a phase modulation section for converting signals from the sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that the phase modulation section has a phase modulation circuit for inputting the phase signal corresponding to an arbitrary sensor signal into a PLL (phase-locked loop) circuit and modulating a carrier wave generated by the PLL circuit based on another sensor signal, thereby generating phase difference signal.

According to the described absolute encoder, it is required to determine the pitch number of a short-pitch phase signal using a long-pitch phase difference signal. For examples, when a phase signal $\phi 01$, being changed in a sawtooth-shape signal having 0–2 $\pi$ levels in accordance with a position change at 128-pitch, is used as a short-pitch sawtooth signal, and a second phase difference signal $\phi 01$, being changed in a sawtooth-shape signal having 0–2 $\pi$ levels in accordance with a position change at 128−96=32 pitch, is used as a long-pitch sawtooth signal, under such a conditions, a quarter-level signal provided by dividing a 128-pitch phase difference signal $\phi 0$ by $2^{K1}$ (for example, K1=2) is provided, and subtraction is made between said signal and the long-pitch phase difference signal so that a stepwise position detection signal formed by said subtraction has four steps (the number of pitches of short-pitch signal contained in one pitch of a long-pitch signal) to be four levels, and the period corresponding to one pitch of the short-pitch signal becomes a flat level.

If the phase zero point of the long-pitch signal is matched with the phase $\pi$ point of the short-pitch signal, the four levels of the stepwise signal formed by the subtracting become a middle of the level of the signal consisting of the high-order two bits of that signal and if some fluctuation occurs between both the signals, the signal of the high-order two bits does not change.

Therefore, the two-bit signal can be used to identify the four-pitch position of the short pitch signal in one pitch of the long-pitch signal. The identified signal becomes a 32-pitch signal with the same pitch as the long-pitch signal. Next, a longer-pitch signal is used to identify the 32-pitch signal. Thus, an absolute value signal can be generated by performing simply operation processing of only bit manipulation without requiring any complicated determination function. A large allowance of a phase error between short and long pitches can be taken.

The function capable of electrically shifting the phase of a phase signal using the phase adjustment circuit is provided, whereby the phase error caused by a mechanical error such as a slit work accuracy error or a sensor installation error can be absorbed and corrected for the phase conditions between the slit strings.

The PLL circuit is used to generate a clock whose frequency changes in association with a phase signal and the clock is used to digitize a phase difference signal, whereby a phase difference signal error can be prevented from occurring even at the high-speed disk rotation time.

To generate a phase difference signal between two sensor signals, a carrier wave having a fixed frequency is phase-modulated by a sensor signal of one of the two sensors, the PLL circuit is used to generate a carrier wave whose period changes in association with the phase-modulated signal, and the carrier wave is further phase-modulated by a sensor signal of the other sensor, whereby a phase difference signal not affected by the disk rotation speed can be generated. Therefore, an absolute encoder adaptable to high-speed rotation can be provided.

BRIEF DESCRIPTION OF THE DRAWINGS

FIGS. 2(a)–(g) to signals a–g in FIG. 1.

FIGS. 3(a)–(p) is a signal waveform chart of the parts following the signal waveform drawing of the absolute value signal generation section shown in FIG. 2. FIGS. 3(g)–(p) correspond to signals g–p in FIG. 1.

Figure 1:
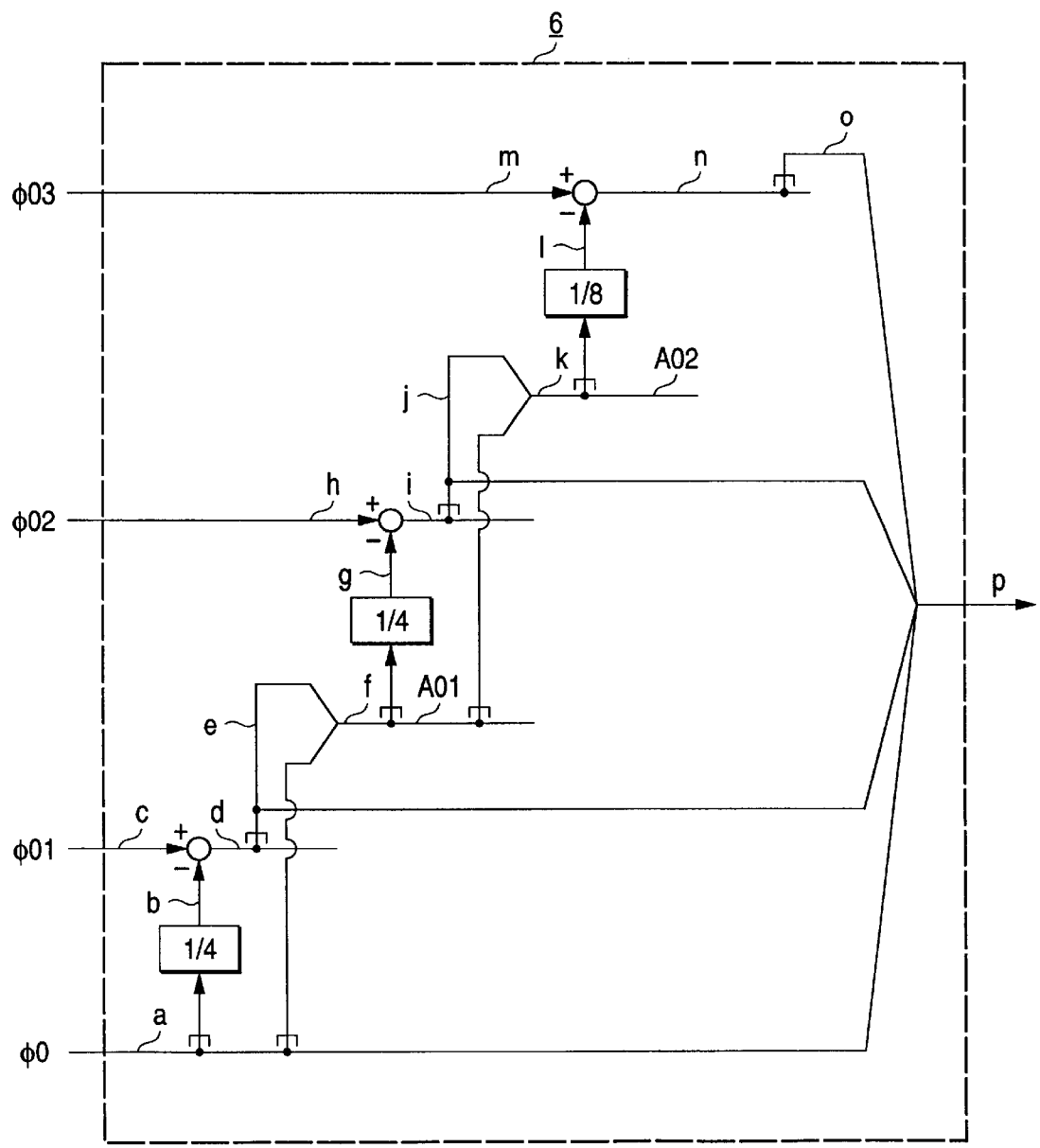
FIG. 1 is a drawing to show signals of parts of an absolute value signal generation section of an absolute encoder according to a first embodiment of the invention.

Description of reference numerals is given as follows:
1: Rotation disk
2: Lattice pattern
3: Sensor
4: Phase modulation section
5: Digital conversion section
6: Absolute value signal generation section
7: Oscillator
8, 26: Frequency divider
9, 10: PLL circuit
23: Phase comparator
24: LPF
25: VCO
36: Phase adjustment section
40: Phase adjustment signal
41: Shift register
42: Multiplexer
43: Adjustment reference clock
44: Switch
45: Phase-shifted phase adjustment signal
46: Binary counter
a: Phase signal $\phi 0$
b: Signal provided by dividing a
c: Phase difference signal $\phi 01$
d: Signal provided by subtracting b from c
e: Signal of high-order bits of d
f: A01 signal
g: Signal provided by dividing f
h: Phase difference signal $\phi 02$
i: Signal provided by subtracting g from h
j: Signal of high-order bits of i
k: A02 signal
l: Signal provided by dividing k
m: Phase difference signal $\phi 03$
n: Signal provided by subtracting i from m
o: Signal of high-order bits of n
p: Absolute value signal
ck: Clock
100 : Reference signal
$\phi 0'$, $\phi 1'$, $\phi 2'$, $\phi 3'$: Phase signal (binarized signal)
$\phi 0$: Phase signal (digitized signal)
$\phi 01'$, $\phi 02'$, $\phi 03'$: Phase difference signal binarized signal)
$\phi 01$, $\phi 02$, $\phi 03$: Phase difference signal (digitized signal)

BEST MODE FOR CARRYING OUT THE INVENTION

Referring now to the accompanying drawings, there are shown embodiments of the invention.

In FIG. 1, numeral 6 denotes an absolute value signal generation section (6 in FIG. 14). a denotes a phase signal $\phi$; here, 128 pitches per rotation of a rotation disk 1. b denotes a signal provided by dividing a by 4 (leveling), and c denotes a phase difference signal $\phi 01$; here, 128–96=32 pitches.

d denotes a signal provided by subtracting b from c (leveling) and the signal d changes stepwise and e denotes a signal of the high-order two bits of the signal d. f denotes an eight-bit signal provided by adding a signal of the high-order six bits of a to the low-order part of e; it is a signal A01 of the same pitch as the c signal. g denotes a signal provided by dividing f by 4 (leveling), and h denotes a phase difference signal $\phi 02$; here, 128–120=8-pitch signal.

i denotes a signal provided by subtracting g from h (leveling) and the signal i changes stepwise and j denotes the high-order two bits of i. k denotes a signal A02 of the same pitch as h, provided by adding a signal of the high-order six bits of f to the low-order part of j. l denotes a signal provided by dividing k by 8 and m denotes a phase difference signal $\phi 03$; here, 1-pitch signal. n denotes a signal provided by subtracting l from m and the signal n changes stepwise and o denotes a signal of the high-order three bits of n. p denotes a 15-bit absolute value signal represented by a, e, j, and o.

FIGS. 2(a) to (g) are waveform drawings of the signals a to g shown in FIG. 1, and FIGS. 3(g) to (p) are also waveform drawings of the signals g to p shown in FIG. 1.

Figure 2:
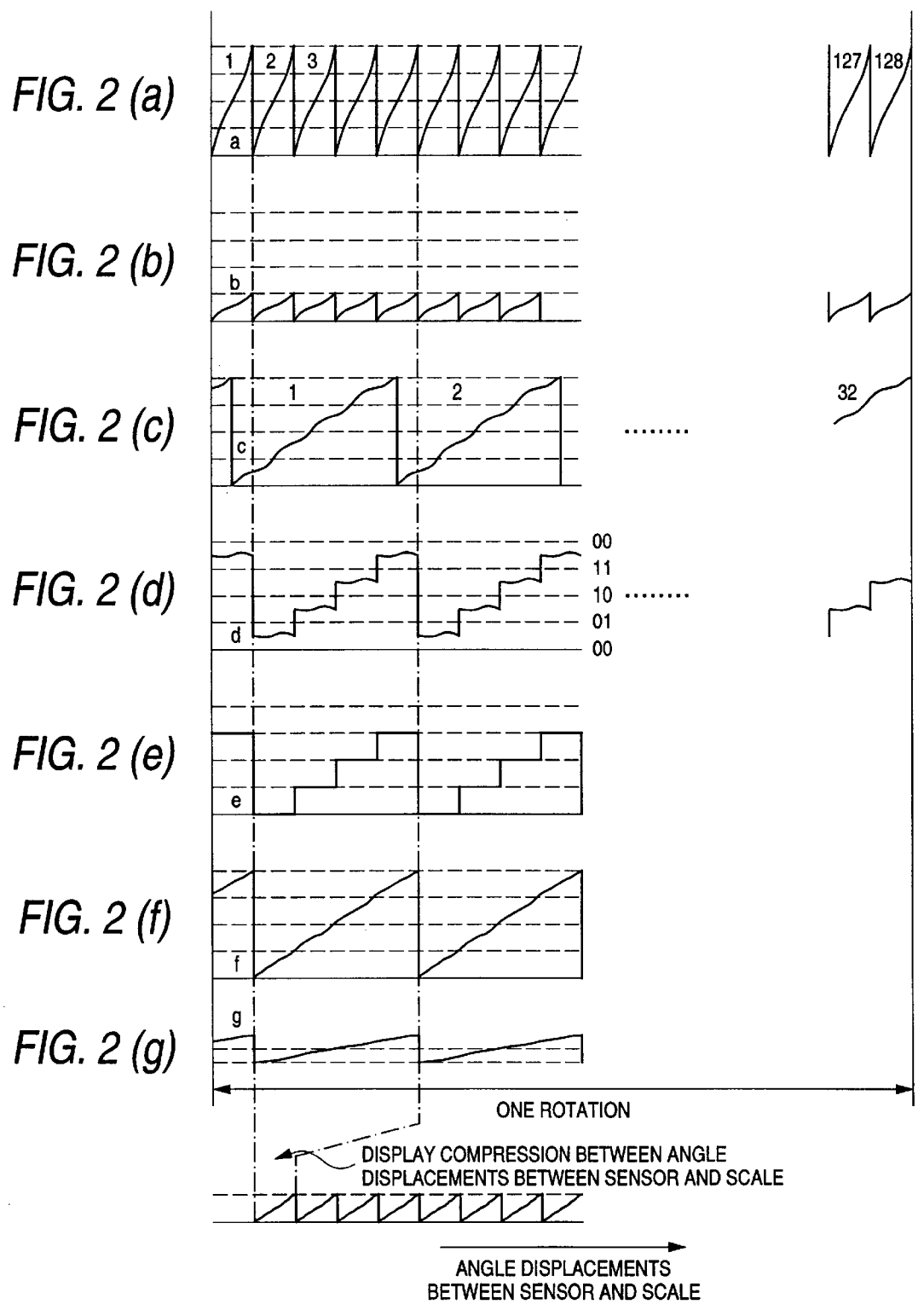
FIGS. 2(a)–(g) is a drawing to show signal waveforms of the absolute value signal generation section shown in FIG. 1.
Figure 3:
Figure 3:
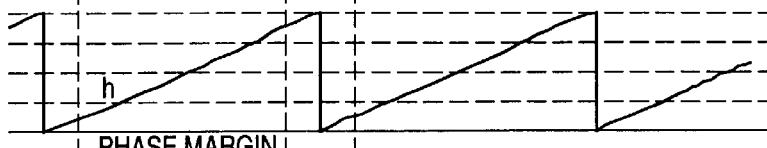
Figure 3:
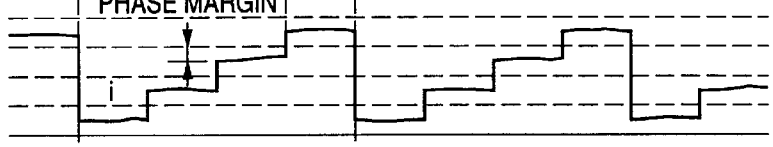
Figure 3:
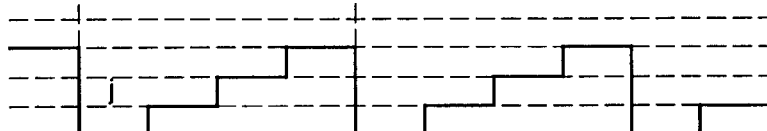
Figure 3:
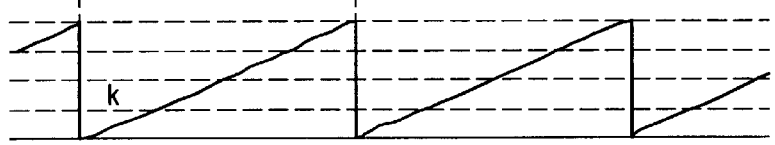
Figure 3:
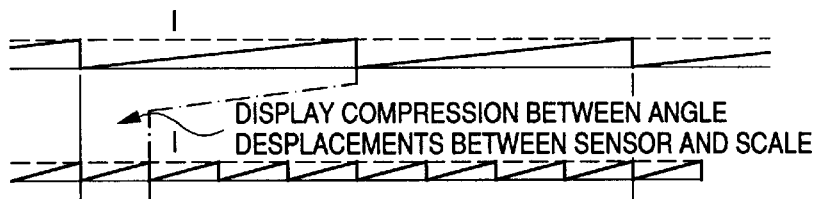
Figure 3:
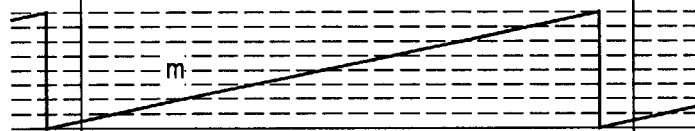
Figure 3:
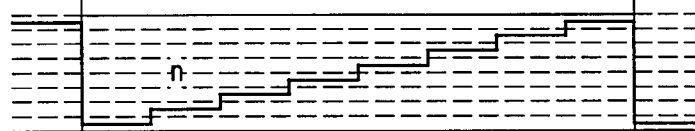
Figure 3:
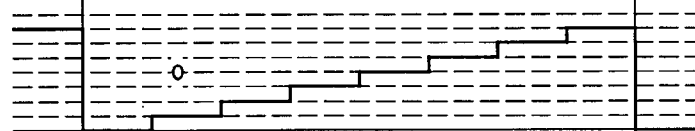
Figure 3:
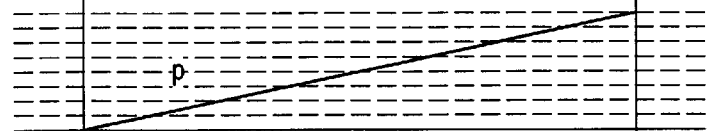

The number of bits of the signal of each part of the absolute value signal generation section 6 shown in FIG. 1, "j," is 8 8-bit digital signal, but the signal waveforms in FIGS. 2 and 3 show those viewed through D/A for easy understanding of the description.

Figure 14:
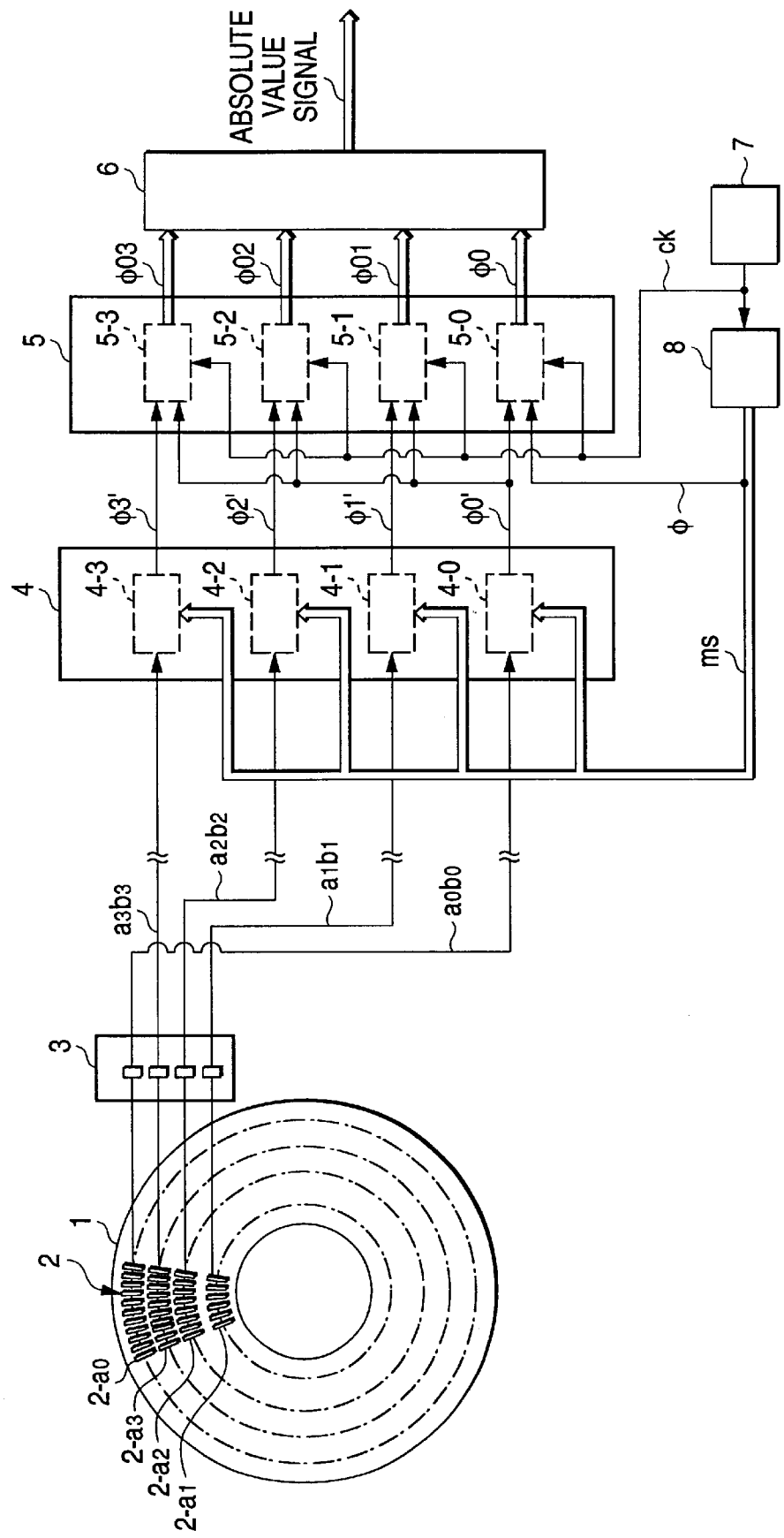
FIG. 14 is a signal processing block diagram of an absolute rotary magnetic encoder.

FIG. 14 is a signal processing block diagram of an absolute rotary magnetic encoder shown in FIG. 1. Numeral 1 denotes a rotation disk, numeral 2 denotes a slit-like lattice pattern formed on the rotation disk, and numeral 3 denotes a magnetic sensor made up of an MR element (magnetoresistance element) and a bias magnet. FIG. 14 shows an example of a case where the rotation disk 1 has four slit strings (2-a0 to 2-a3). The magnetic sensor 3 detects angle displacement of the rotation disk 1 from the lattice pattern 2 formed on the rotation disk 1.

Four lattice patterns (slit strings 2) different in the number of pitches at equal pitches are provided on the rotation disk 1.

The number of pitches is set as follows:
(1) 2-a0: 128,
(2) 2-a1: 96,
(3) 2-a2: 120,
(4) 2-a3: 127.

A two-phase sinusoidal signal of a period equal to the slit pitch is output from the magnetic sensor 3 and is input to a phase modulation section 4, which then converts the two-phase sensor signal into phase signals φ0' to φ3'.

Figure 15:
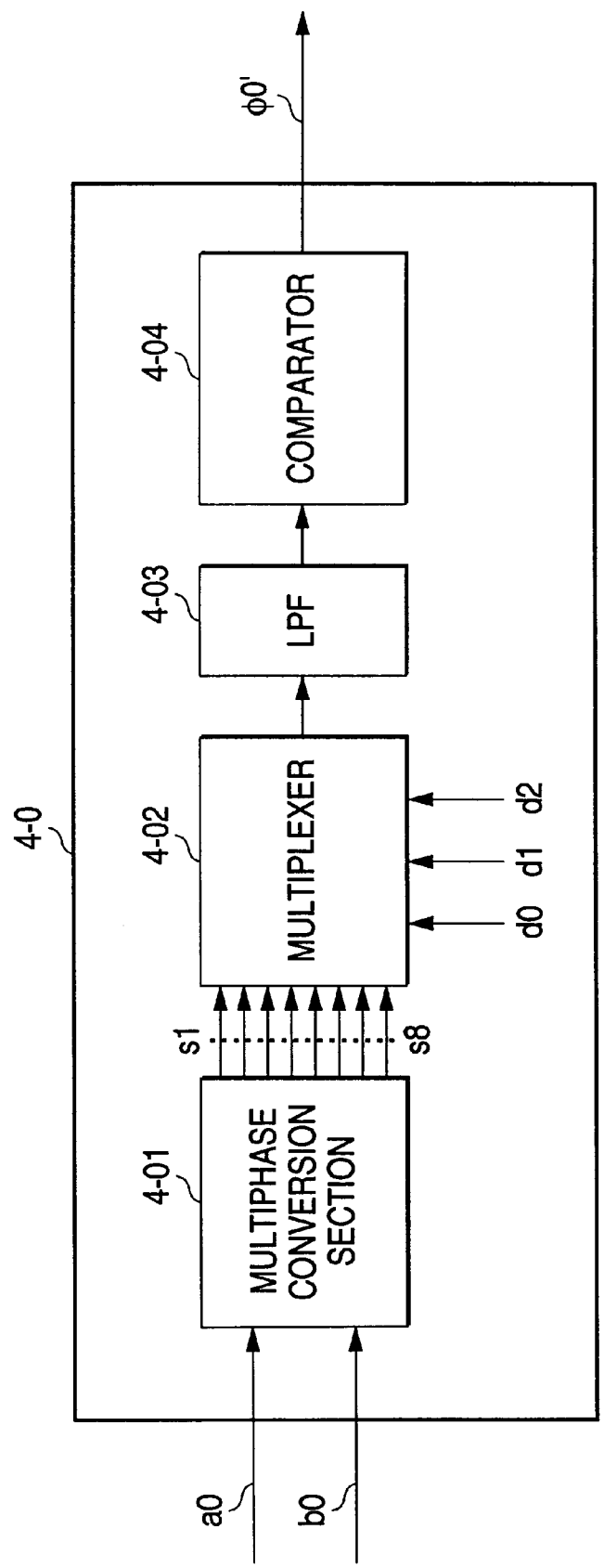
FIG. 15 is a block diagram of phase modulation circuit components.
Figure 16:
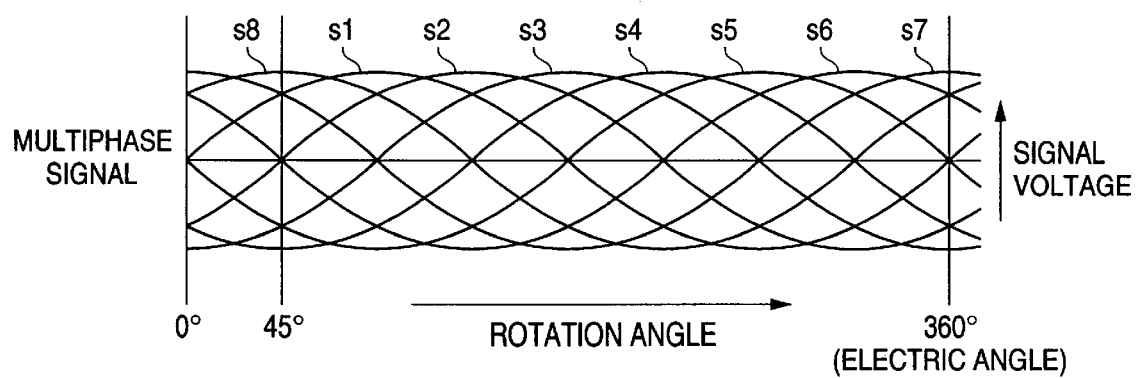
FIG. 16 is a waveform chart of a multiphase signal.
Figure 17:
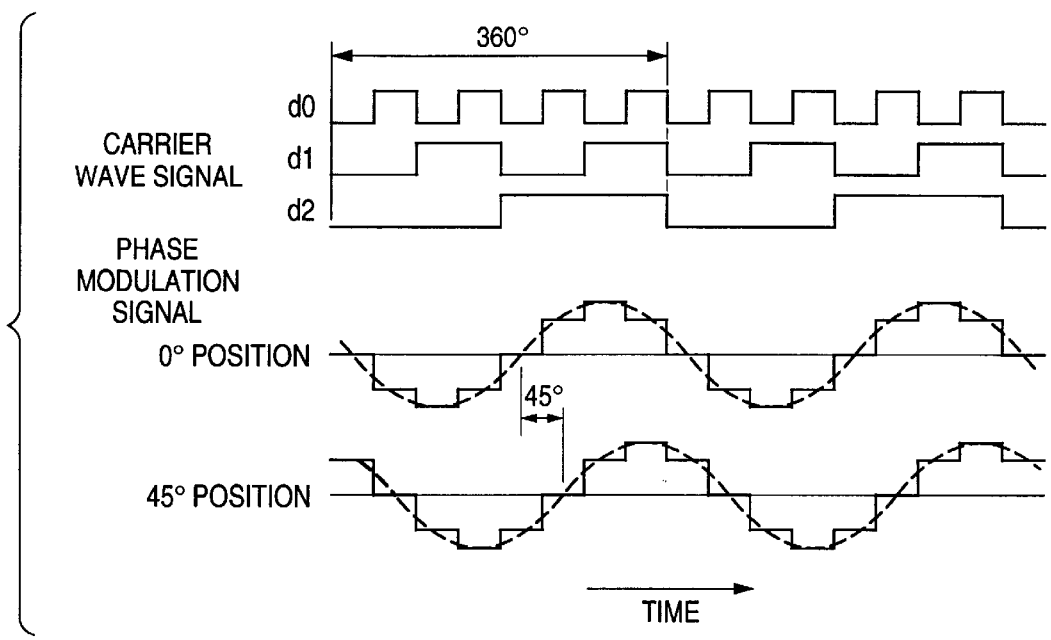
FIG. 17 is a time chart of a carrier signal and a phase modulation signal.

The phase modulation section 4 consists of four phase modulation circuit sections (4-0 to 4-3) provided in a one-to-one correspondence with the four slit strings. FIG. 15 is a block diagram of the phase modulation circuit section 4-0. The phase modulation circuit section 4-0 consists of a multiphase conversion section 4-01, a multiplexer 4-02, a low-pass filter (LPF) 4-03, and a comparator 4-04. The multiphase conversion section 4-01 weights the two-phase sensor signal and adds, thereby converting the two-phase sensor signal into a multiphase signal such as a four-phase or eight-phase multiphase signal. FIG. 16 shows the waveform of an eight-phase multiphase signal (s1 to s8). The multiphase signal is a sinusoidal waveform having a period equal to the slit pitch with respect to the rotation disk rotation angle. The multiphase signal is sampled in order by the multiplexer 4-02. A carrier signal ms for sampling consists of three-bit binary signal (d0, d1, d2) if the multiphase signal consists of eight phases; the carrier signal ms is provided by dividing an oscillator 8. d2 having the longest period is used as a phase reference signal φ. FIG. 17 is a time chart of the carrier signal ms and the sampled signal (phase modulation signal). The phase modulation signal shown in FIG. 17 is applied when the rotation positions of the rotation disk 1 are 0 degrees and 45 degrees in terms of the electrical angle of the multiphase signal shown in FIG. 16. The dotted-line waveforms represent fundamental components.

The phase modulation signal has a harmonic content removed through the LPF and further is converted into a rectangular wave signal by the comparator. This is a binarized phase signal and the difference between the edge position of the reference signal φ and the edge position of the phase signal provides information representing the angle of the rotation disk 1.

Figure 18:
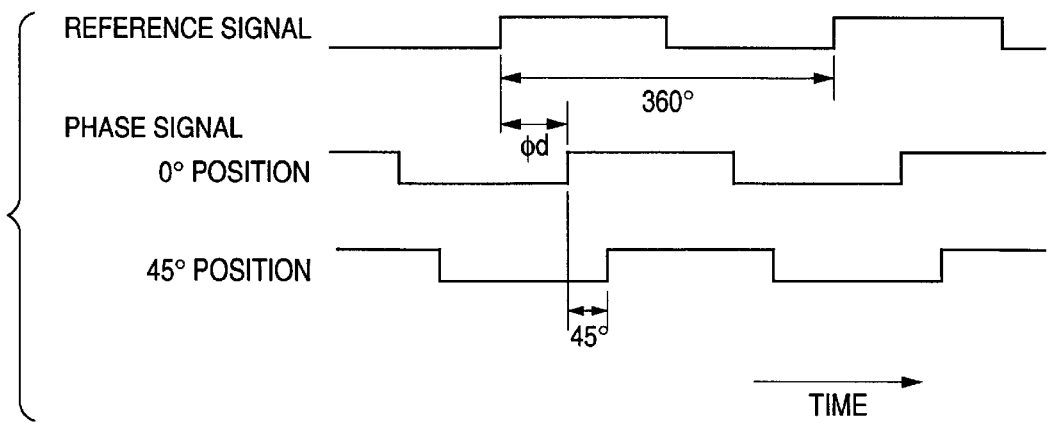
FIG. 18 is a time chart of a phase signal.

FIG. 18 is a time chart of the phase signal. In FIG. 18, when the rotation position is 0 degrees in terms of the electrical angle of the multiphase signal, the phase signal becomes a signal having a phase delay of φd caused by a phase delay caused by the multiphase conversion section and the LPF. Next, when the rotation position is 45 degrees in terms of the electrical angle of the multiphase signal, the phase signal becomes a signal having a phase delay of φd+45 degrees (the above-described phase delay of φd plus 45 degrees of the phase of the multiphase signal), and the phase signal changes 45 degrees with one cycle of the reference signal as 360 degrees. That is, the phase signal becomes a signal whose phase changes in response to phase change of the multiphase signal.

The phase signal is input to a digital conversion section 5. The four slit strings are formed on the rotation disk 1; one of the slit strings is the main slit string (2-a0) and others are auxiliary slit strings (2-a1 to 2-a3). The digital conversion section 5 converts the phase signal φ0' obtained from the main slit string into a digital signal φ0 having a certain number of bits and generates digitized phase difference signals (φ01 to φ03) between the main slit string and the auxiliary slit strings. Numeral 6 denotes the absolute value signal generation section for a signal concerning an absolute position by using the digitized phase signal and phase difference signals.

Next, the operation of the absolute value signal generation section will be discussed in detail with reference to the accompanying drawings.

The absolute value signal p is a 15-bit (d0–d14) signal. The generation method of the bits will be discussed with reference to FIG. 1, FIGS. 2(*a*) to (*g*), and FIGS. 3(*g*) to (*p*).

The low-order eight bits d0 to d7 are generated from the phase signal φ0. In FIG. 1, a denotes the phase signal φ0 and its waveform is shown in FIG. 2(*a*). a denotes a 128-pitch signal repeating 128 times from 0 to 2 π in one disk rotation.

Next, how d8 and d9 are generated will be discussed.

b denotes an eight-bit signal provided by taking out the high-order six bits of a and adding two bits of 0 to the high order part. In this process, b becomes a quarter amount of a (corresponding to process of φ0/$2^{K1}$, K1=2).

c denotes the phase difference signal φ01 between the slit strings 2-a0 and 2-a1 and the signal c becomes a signal of the number-of-pitches difference between the slit strings (128−96)=32 pitches (period of 4:1 to a) in one disk rotation.

d denotes a signal provided by subtracting b from c, the signal d changes stepwise at the position where the phase of a is zero, and the gradients of b and c equal with respect to disk displacement, thus the signal becomes an almost flat signal between steps although it slightly fluctuates because of the effect of waveform distortion of detection signal.

The slit position is determined so that the phase zero point of the phase of c becomes the π point of a. In doing so, the level between steps of d becomes almost the center of the level based on the high-order two bits of d and a signal with the high-order two bits of d not changing between steps (signal e) results. This becomes d8 and d9.

Subsequently, how d10 and d11 are generated will be discussed. f (A01) denotes a signal provided by adding the high-order six bits of a as the low-order bits to the high-order two bits of d, and g denotes an eight-bit signal provided by taking out the high-order six bits of f and adding two bits of 0 to the high order part. In this process, g becomes a quarter amount of f.

Next, referring to FIG. 3, h shown in FIG. 3(*h*) denotes the phase difference signal φ02 between the slit strings 2-a0 and 2-a2 and the signal h becomes a signal of the number-of-pitches difference between the slit strings (128−120)=8 pitches in one disk rotation.

i denotes a signal provided by subtracting g from h, the signal i changes stepwise at the position where the phase of f is zero, and the gradients of g and h equal with respect to disk displacement, thus the signal becomes an almost flat signal between steps.

The slit position is determined so that the phase zero point of the phase of h becomes the π point of f.

In doing so, the level between steps of i becomes almost the center of the level based on the high-order two bits of i and a signal with the high-order two bits of i not changing between steps (signal j) results. This becomes d10 and d11.

Next, how d12, d13, and d14 are generated will be discussed. k (A02) denotes a signal provided by adding the high-order six bits of f as the low-order bits to the high-order two bits of i, and l denotes an eight-bit signal provided by taking out the high-order five bits of k and adding three bits of 0 to the high order part. In this process, l becomes an eighth amount of k.

m denotes the phase difference signal φ03 between the slit strings 2-a0 and 2-a3 and the signal m becomes a signal of the number-of-pitches difference between the slit strings (128−127)=1 pitch in one disk rotation.

n denotes a signal provided by subtracting l from m, the signal n changes stepwise at the position where the phase of k is zero, and the gradients of l and m equal with respect to disk displacement, thus the signal becomes an almost flat signal between steps. The slit position is determined so that the phase zero point of the phase of m becomes the π point of k. In doing so, the level between steps of n becomes almost the center of the level based on the high-order three bits of n and a signal with the high-order three bits of n not changing between steps (signal o) results. This becomes d12, d13, and d14.

The 15-bit absolute value signal p of d0 to d14 is thus generated and the pitch number of φ0 is determined.

Next, the effect of a phase error will be discussed by taking the phase between signal "f" and signal "h" as an example.

As seen from the description given above, the i signal is generated based on f and h. If a phase error exists, the level of the flat portion of the i signal changes. d10 and d11 of the absolute value signal p are the high-order two bits of i and a phase margin of ±π/4 exists until a change point of the signals. In fact, the phase margin is a little narrowed because of the effect of the resolution of digital processing, but d10 and d11 of the absolute value signal p are not affected until the phase error between f and h is almost ±π/4. This becomes a theoretically possible phase margin. Therefore, a double phase margin can be taken as compared with π/8 in the example in the related art.

Thus, according to the first embodiment of the invention, shorter-pitch signals are processed in order, whereby such a condition under which the pitch number cannot be determined is eliminated, so that a large allowance of an allowed error between slits can be taken, complicated determination processing of a microcomputer becomes unnecessary, and it is made possible to generate an absolute value signal simply by performing easy bit manipulation.

To generate a phase difference signal of a certain number of pitches, the phase difference from φ0 is adopted in the embodiment; however, the phase difference from φ0 need not necessarily be adopted. For example, the eight-pitch phase difference signal is the phase difference signal φ02 between the 128-pitch phase signal φ0 and the 120-pitch phase signal φ2 in the embodiment, but φ2 may be a 119-pitch signal and the phase difference signal between the 119-pitch signal and a 127-pitch signal φ3 may be adopted as an eight-pitch phase difference signal.

The description has been made by taking the rotary encoder as an example, but it is evident that the invention can also be applied to a linear encoder; the invention is also applicable to an optical form, an electrostatic form, etc., in addition to the magnetic form.

Next, a second embodiment of the invention will be discussed with reference to the accompanying drawings.

The absolute encoder using the vernier-type slits in the first embodiment of the invention requires that the phase relationship among the slits be placed in predetermined conditions as described in claim 2. If the phase relationship between the slit strings differs largely from the predetermined phase relationship depending on the work accuracy of each slit or the assembly accuracy of the magnetic sensor, there is a possibility that the phase margin required for performing normal absolute value signal processing will be exceeded, making it impossible to provide the correct absolute value signal. As the absolute encoder is provided with a higher resolution, a less sufficient phase margin between slit strings can be taken, thus it becomes difficult to provide the absolute encoder with a higher resolution. These are problems.

Figure 4:
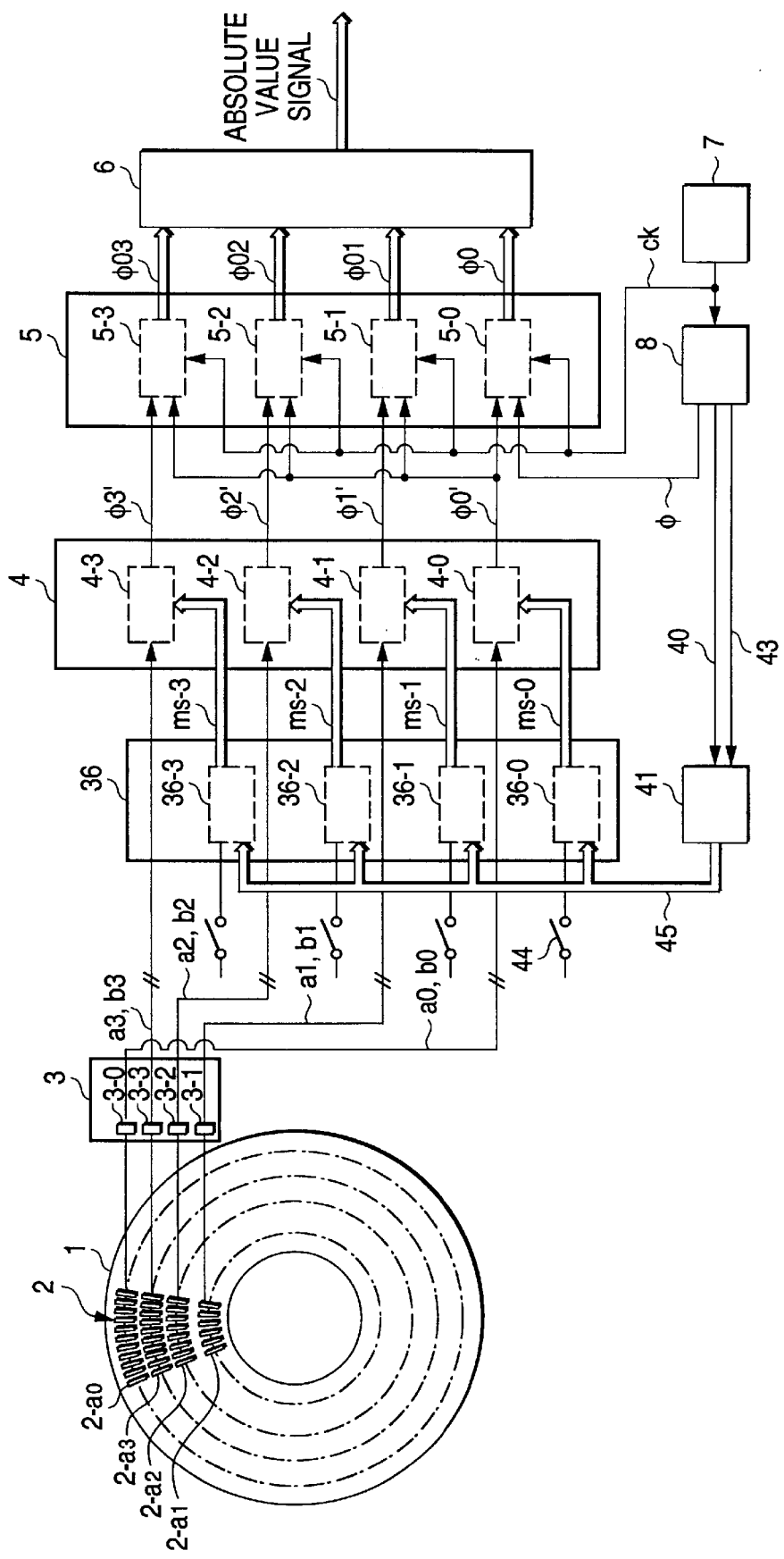
FIG. 4 is a block diagram of signal processing of an absolute rotary magnetic encoder according to a second embodiment of the invention.
Figure 5:
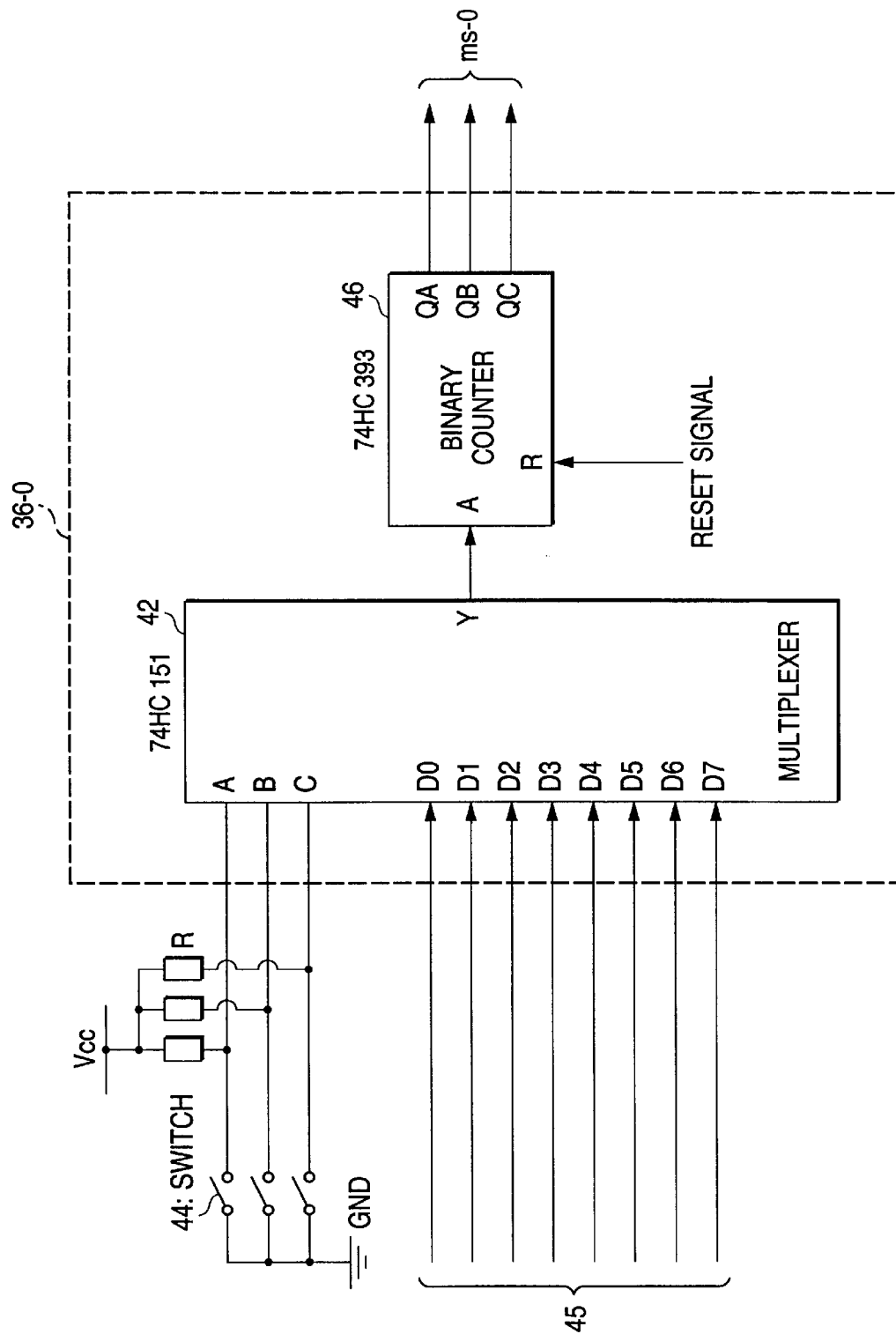
FIG. 5 is a diagram to show a phase adjustment circuit shown in FIG. 4.
Figure 6:
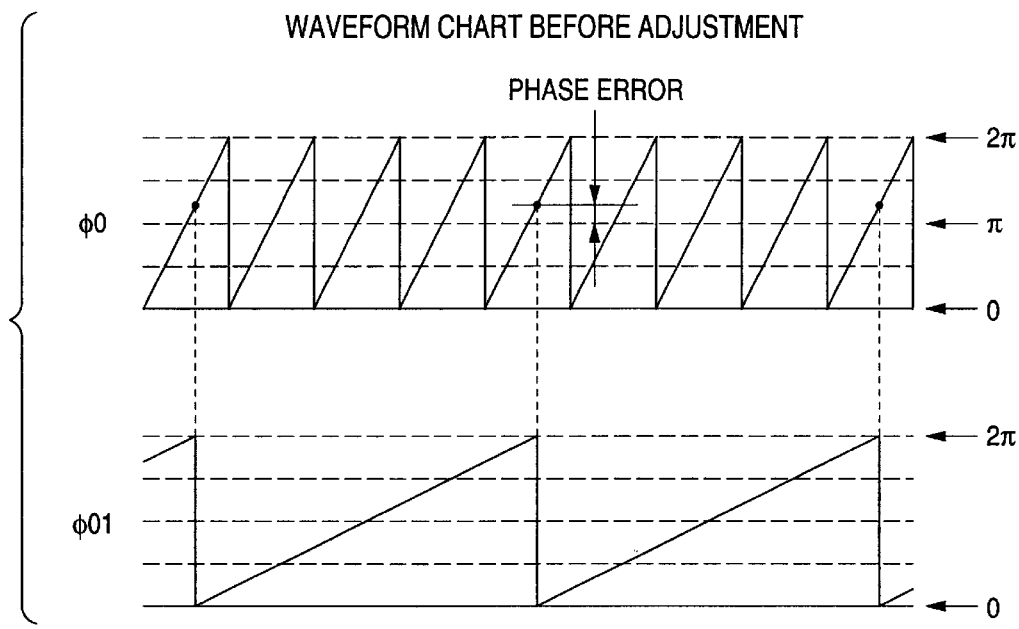
FIG. 6 is waveform charts to show the operation of a phase difference signal shown in FIG. 4.
Figure 6:
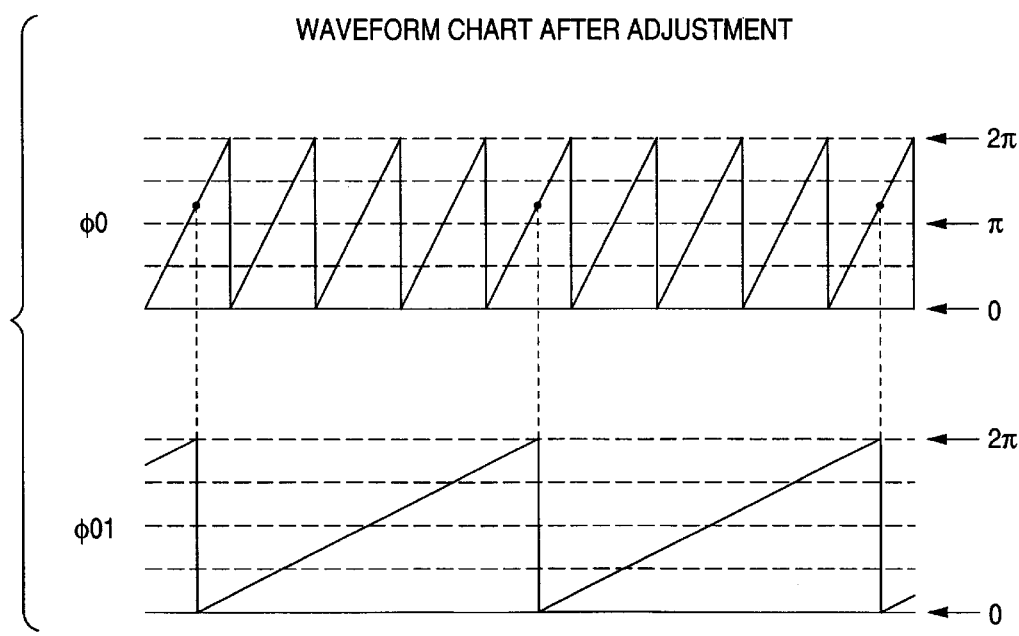

The second embodiment of the invention is intended for solving these problems. In FIG. 4 to show the second embodiment, a shift register 41 shifts a phase adjustment signal 40 in order by period of an adjustment reference clock 43 and inputs a phase-shifted phase adjustment signal 45 into a phase adjustment circuit 36. FIG. 5 is a circuit diagram of the phase adjustment circuit 36; it shows one of the four circuit sections. The phase adjustment signal 45 is input to a multiplexer 42 and phase adjustment signal 45 whose phase is shifted in an appropriate shift amount through a switch 44 is selected. From the selected signal, a binary counter 46 generates a carrier signal ms-0 to ms-3 to a phase modulation section 4, whereby the phases of phase signals φ0' to φ3' can be shifted and thus the phase relationship between a phase signal φ0 and phase difference signals φ01 to φ03 of a digital conversion section can be adjusted to predetermined position. FIG. 6 shows a case where the phase relationship between slit strings contains an error; FIGS. 6(a) is a waveform chart before adjustment between φ0 and φ01 and (b) is a waveform chart after adjustment. After the adjustment, the π point of φ0 becomes the zero point of φ01 (predetermined condition as described in claim 2).

If the phase relationship between the slit strings differs from the predetermined phase relationship depending on the work accuracy of each slit or the assembly accuracy of the magnetic sensor, the phase adjustment circuit can correct it, so that a phase margin of signal processing in absolute value signal generation can be provided and a high-resolution absolute encoder can be provided.

The adjustment range can be increased by increasing the number of bits of the shift register 41 in FIG. 4 or the adjustment resolution can be changed by changing the frequency of the adjustment reference clock 43.

Next, a third embodiment of the invention will be discussed with reference to the accompanying drawings.

The absolute encoder of the first embodiment of the invention using the vernier-type slits uses the scale (rotation disk) formed with slit strings having equal slit pitches and different in slit length to detect the phase difference between the slit strings and uses the signals to generate a signal concerning an absolute position, as described above.

However, the absolute encoder using the vernier-type slits in the first embodiment of the invention involves a problem in generation of the phase difference signals φ01 to φ03. That is, as described above, the phase conversion section 4 converts phase change of a sensor signal corresponding to the rotation position of the rotation disk 1 into phase signals φ0' to φ3' having phases changed with respect to the reference signal φ0. When the rotation disk rotates, the phase signal has the phase changed as much as one pitch of the reference signal (2 π) relative to one-pitch angle displacement of the sensor signal (electrical angle 360 degrees). This means that if the rotation disk 1 rotates at one speed, the phase signal pitch changes at the rotation speed of the rotation disk 1; the phase signal pitch when the rotation disk rotates at a given speed becomes a length corresponding to the number of pitches of the reference signal in one pitch of a multiphase signal plus one (when a phase lead occurs) or minus one (when a phase lag occurs). Since the phase signal pitch thus changes depending on the rotation speed of the rotation disk 1, the phase difference signal value is affected by the speed and the correct phase difference signal cannot be provided; this is a problem.

This point will be discussed more specifically with FIG. 7.

φ denotes a reference signal and a0 and a1 denote sensor signals detected from slit strings 2-a0 and 2-a1; only one of two phases of each sensor signal is shown. The number-ofslit-pitches ratio between 2-a0 and 2-a1 is 4:3. The sensor signal period changes with speed; FIG. 7 is a time chart at such speed at which one pitch of the sensor signal a0 becomes just equal to three pitches of the reference signal φ0. Since the pitch length of the a1 signal is 4/3 times the pitch length of the a0 signal, the four pitches of the reference signal φ0 are just equal to one pitch of the a1 signal. φ0' and φ1' are phase signals corresponding to the sensor signals a0 and a1. If the rotation disk rotates in the direction in which the phases of a0 and a1 lead, the numbers of pitches of φ0' and φ1' in pitches of a0 and a1 become each the number of pitches of φ in the pitch plus one.

That is, the number of pitches of φ0' becomes 3+1=4, and the number of pitches of φ1' becomes 4+1=5.

The four-pitch length of the sensor signal a0 equals the three-pitch length of a1 and the length becomes the vernier pitch length where the phase difference between both the signals becomes 2π. The numbers of pitches of φ0' and φ1' in the vernier pitch become the number of pitches of the reference signal φ0 in the vernier pitch, 12, plus the numbers of pitches of a0 and a1 in the pitch, 4 and 3.

That is, the number of pitches of φ0' becomes 12+4=16, and the number of pitches of φ1' becomes 12+3=15.

Next, the detection gain of the phase difference signal φ01 will be discussed.

The phase difference signal φ01 is provided by counting clock ck between the rising edges of the phase signals φ0' and φ1'. The count is read in synchronization with φ1' and the digitized phase difference signal φ01 is provided.

The difference between adjacent kth and (k+1)st phase difference signals, namely, $(\phi 01_{(k+1)} - \phi 01_{(k)})$ becomes as follows:

$$\phi 01_{(k+1)} - \phi 01_{(k)} = \{(\text{pitch length of } \phi 01'/\text{pitch length of } \phi) - (\text{pitch length of } \phi 0'/\text{pitch length of } \phi)\} \times 2\pi = \{(12/15) - (12/16)\} \times 2\pi$$

The number of pitches of φ1' in the vernier pitch is 15 and the phase difference detection gain becomes $(1/20) \times 2\pi \times 15 = (3/4) \times 2\pi$.

It is seen that the gain lowers 25%.

Likewise, if the rotation disk rotates in the direction in which the phases of φ0' and φ1' lag, it is seen that the detection gain rises although not described in detail.

Thus, the period of the phase signal changes depending on the disk speed. Therefore, in a state in which the rotation disk rotates, the correct phase difference signal cannot be provided and the phase margin in absolute value signal generation lessens, and if the speed becomes fast, absolute value signal generation is not carried out correctly. This is a problem.

Thus, in the first embodiment of the invention, the phase signal period varies with the rotation speed of the disk and an error occurs in the phase difference signal. Particularly, if the disk rotates at high speed, the error becomes large and it becomes difficult to use the absolute encoder in high-speed rotation. This is a problem.

Then, in the third embodiment of the invention, an absolute encoder adaptable to high-speed rotation wherein an error is prevented from occurring even in high-speed rotation is provided.

Figure 8:
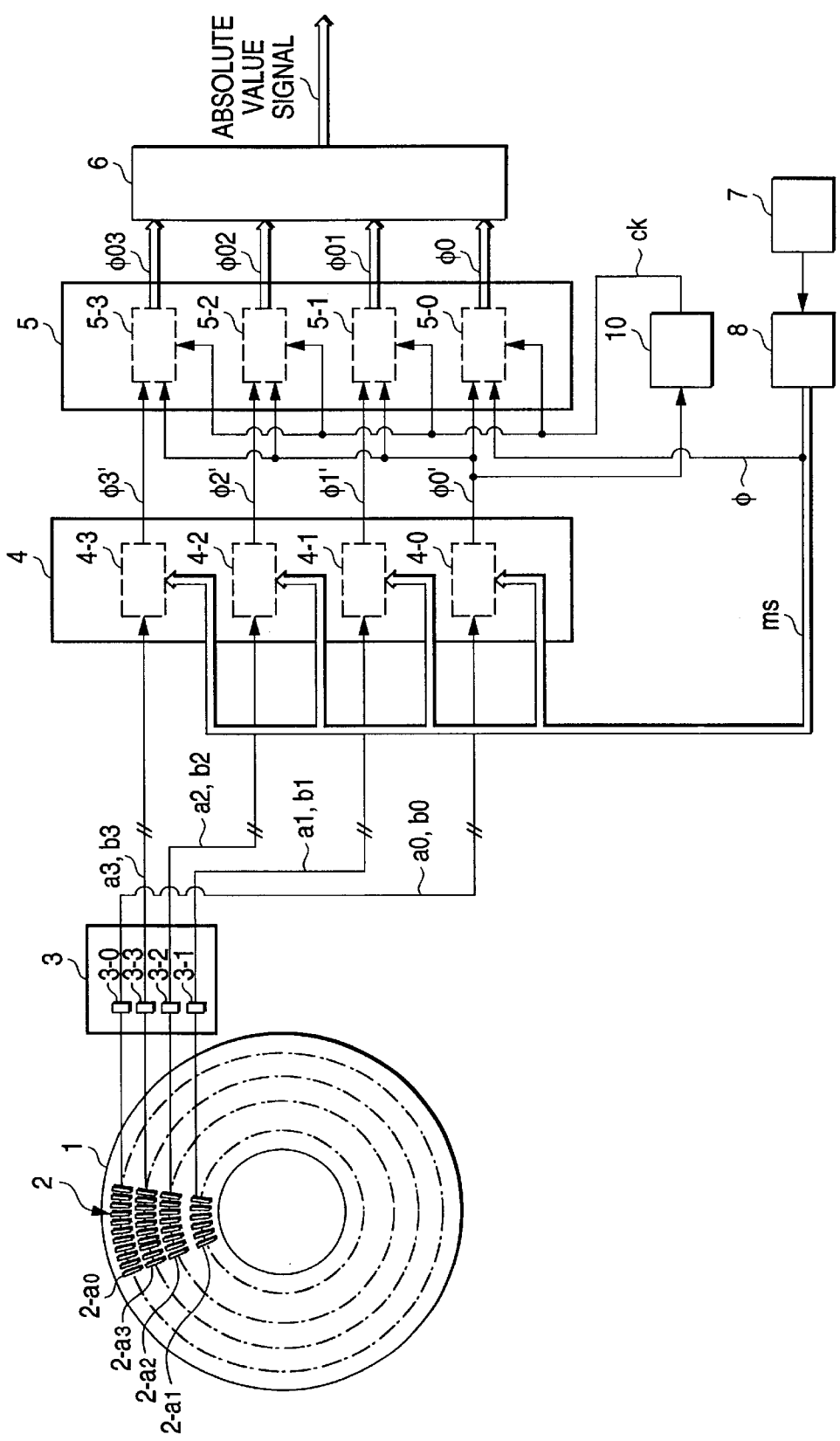
FIG. 8 is a block diagram of signal processing of an absolute rotary magnetic encoder according to a third embodiment of the invention.

The absolute encoder of the third embodiment shown in FIG. 8 differs from the rotary magnetic encoder of the first embodiment shown in FIG. 14 in that a PLL circuit 10 is added for suppressing occurrence of an error in a phase difference signal at the high-speed rotation time of disk in FIG. 8. The configurations of the encoders in FIGS. 14 and 8 are the same in other points.

Figure 9:
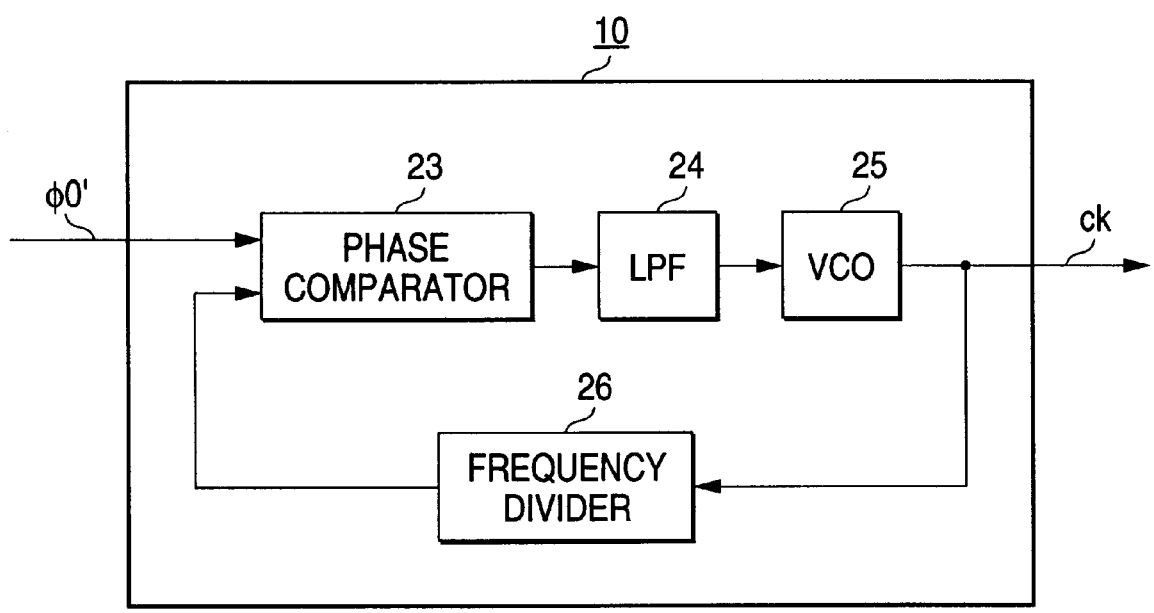
FIG. 9 is a block diagram of a PLL circuit 10 shown in FIG. 8.

FIG. 9 shows the PLL circuit in detail. As known, the PLL circuit is made up of a phase comparator 23, a low-pass filter LPF 24, an oscillator VCO 25, and a frequency divider 26, and is a circuit for controlling oscillation bias of the VCO 25 using the difference of the phase shift comparison result between an adjusted wave and a reference wave by the phase comparator 23 as DC change through the LPF 24, thereby adjusting the phase shift.

Therefore, the output of the PLL circuit shown in FIG. 9 is a clock whose frequency (phase) changes in association with the period of a phase signal φ0'. In the rotation speed conditions as previously described with reference to FIG. 7, the frequency of the phase signal φ0' is 16/12=4/3 times the frequency of φ and if PLL is formed of the phase signal φ0', the clock frequency becomes 4/3 times that when a rotation disk 1 is standing still and if a phase difference signal φ01 is generated based on the clock, the detection gain becomes one and a correct phase difference signal adjusted with no error can be provided.

Figure 7:
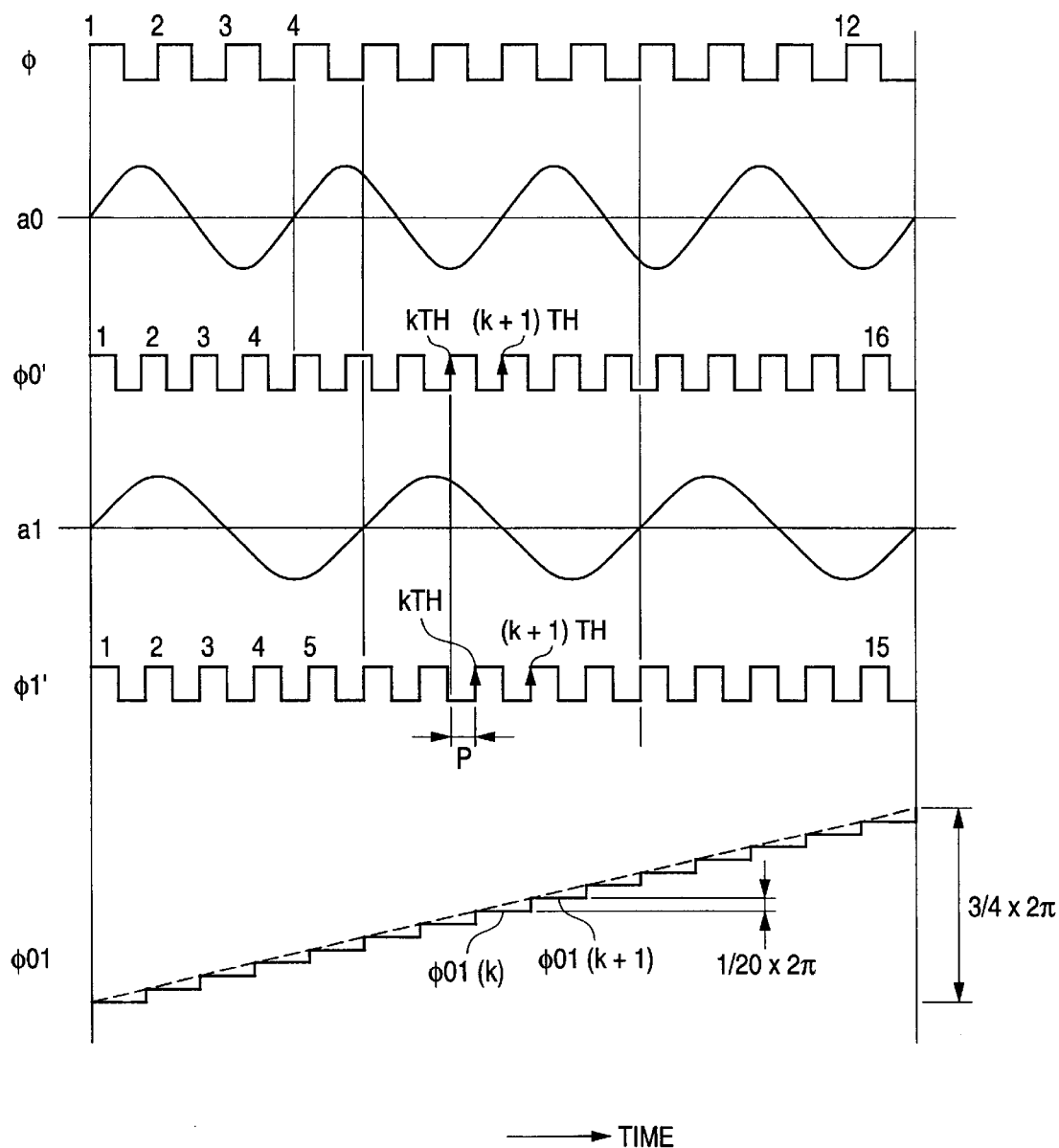
FIG. 7 is a drawing to describe a problem of an encoder.

The case where the rotation disk 1 rotates in the direction in which the phases of the phase signals φ0' and φ1' lead is shown in FIG. 7; if the rotation disk 1 rotates in an opposite direction, it is obvious from the description made so far that an adjustment can be made so as to prevent a detection gain error from occurring.

Further, for the digitized phase difference signal φ0 between the reference signal φ and the phase signal φ0', it is also obvious from the description made so far that an adjustment can be made so as to prevent a detection gain error from occurring.

Thus, according to the third embodiment, a detection gain error of the phase difference signal can be prevented from occurring in high-speed rotation or a high-speed move of the scale (rotation disk), so that it is made possible to generate an absolute value signal with high accuracy and an absolute encoder adaptable to high-speed rotation can be provided easily.

Next, a fourth embodiment of the invention will be discussed with reference to the accompanying drawings.

As described above, the first embodiment of the invention involves the following problem: The phase signal period varies with the rotation speed of the disk and an error may occur in the phase difference signal. Particularly, if the disk rotates at high speed, the error becomes large and it becomes difficult to use the absolute encoder in high-speed rotation.

The fourth embodiment of the invention is characterized by the fact that an absolute encoder comprises a scale formed with a plurality of lattice patterns at equal pitches and different in pitch length, a plurality of sensors for making a relative move to the scale for detecting the lattice patterns, a phase modulation section for converting a signal from the sensor into a phase signal or a phase difference signal, a digital conversion section for converting the phase difference signal and the phase difference signal into digital signal, and an absolute value signal generation section for generating a signal concerning an absolute position based on the output signal of the digital conversion section, wherein of two arbitrary sensor signals, a phase sign provided from one sensor or a carrier wave generated from the phase signal is further phase-modulated based on a signal from another sensor, whereby the phase difference signal is generated.

Thus, according to the fourth embodiment of the invention, if the scale moves at high speed, a detection gain error does not occur in a phase difference detection signal, thus a phase margin for absolute value signal generation does not lessen. Therefore, a high-speed absolute encoder can be provided.

The fourth embodiment of the invention will be discussed with reference to the accompanying drawings.

Figure 10:
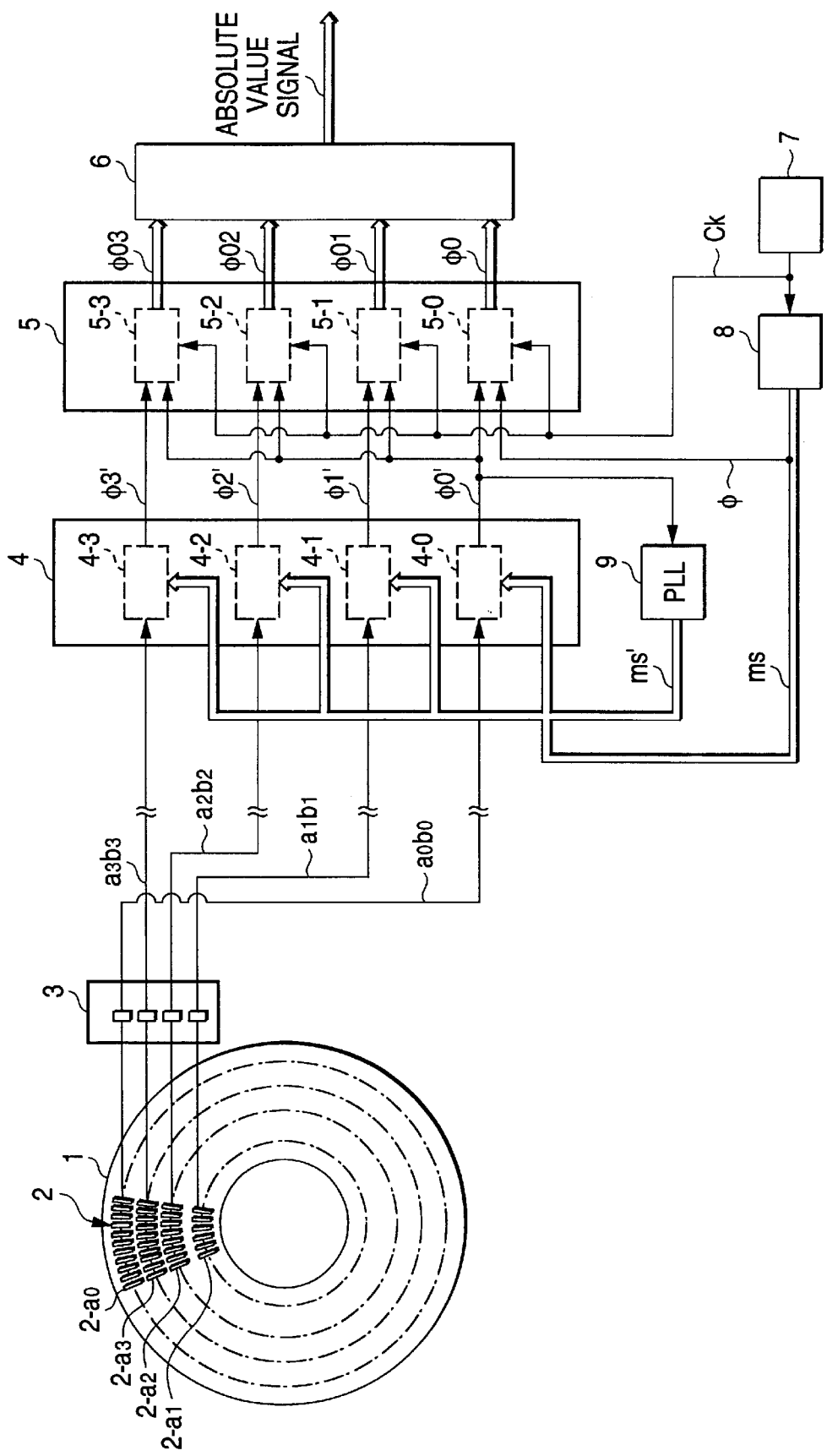
FIG. 10 is a block diagram of signal processing of an absolute rotary encoder according to a fourth embodiment of the invention.

FIG. 10 is a block diagram of signal processing of an absolute rotary encoder using the invention.

In a phase modulation section 4, a generation method of a phase signal φ0' of a main slit string 2-a0 is the same as that in the related art and a signal ms (d0, d1, d2) provided by dividing an output signal of an oscillator 7 by a frequency divider 8 is used as a carrier signal of a phase modulation circuit section 4-0. However, a signal ms' whose period changes in association with φ0' is used as a carrier signal of phase modulation circuit sections 4-1, 4-2, and 4-3 corresponding to auxiliary slit strings 2-a1, 2-a2, and 2-a3. The signal ms' is generated by using a PLL circuit 9. Output signals of the phase modulation circuit sections 4-1, 4-2, and 4-3 generated based on the signal ms', φ01', φ02', and φ03', become phase difference signals between the main slit string 2-a0 and the auxiliary slit strings 2-a1, 2-a2, and 2-a3 (binarized signals). Numeral 5 denotes a digital conversion section for converting the phase signal φ0' and the phase difference signals φ01' to φ03' into digital signals each of a certain number of bits.

Figure 11:
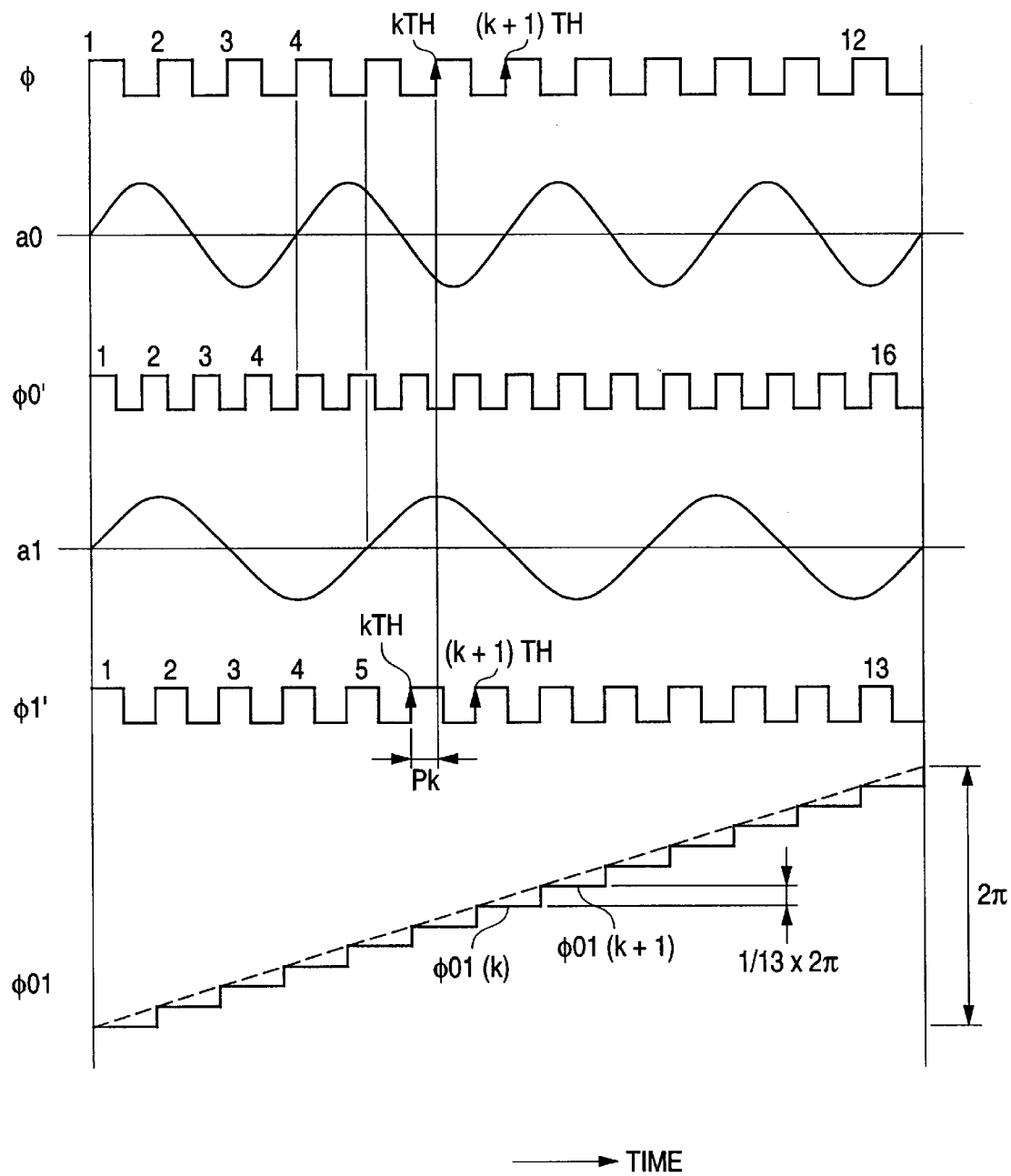
FIG. 11 is a phase difference signal generation time chart of the invention shown in FIG. 10.

FIG. 11 is a phase difference signal generation time chart of the invention.

A generation method of the phase difference signal φ01 between the main slit string 2-a0 and the auxiliary slit string 2-a1 will be discussed specifically with FIG. 11. This generation method can also be applied to phase difference signal generation between the mains lit string and other auxiliary slit strings.

FIG. 11 is a time chart of signals of the parts when a rotation disk rotates at a given speed. φ denotes a reference signal and a0 and a1 denote sensor signals detected from the main slit string 2-a0 and the auxiliary slit string 2-a1; only one phase (a0, and a1) of two phases (a0, b0 and a1, b1) is shown. If the number-of-slit-pitches ratio between 2-a0 and 2-a1 is set to 4:3, the four-pitch length of a0 equals the three-pitch length of a1 and the length becomes the vernier pitch length where the phase difference between both the signals becomes $2\pi$.

First, the numbers of pitches of the phase signal φ0' and the phase difference signal φ01' in the vernier pitch will be discussed. The period of the sensor signal a0 changes with the rotation disk speed; FIG. 11 is a time chart at such speed at which the one-pitch length of a0 becomes just equal to the three-pitch length of φ0. Since the pitch length of the a1 signal is 4/3 times the pitch length of the a0 signal, the four-pitch length of the reference signal φ0 is just equal to the one-pitch length of the a1 signal. If the rotation disk rotates in the direction in which the phase of φ0' leads, the number of pitches of the phase signal φ0' in one pitch of a0 becomes the number of pitches of the reference signal φ in the pitch plus one, namely, four. The number of pitches of φ0 in the vernier pitch becomes the number of pitches of the reference signal φ0 in the vernier pitch, 12, plus the number of pitches of a0 in the pitch, 4, namely, 16.

Figure 12:
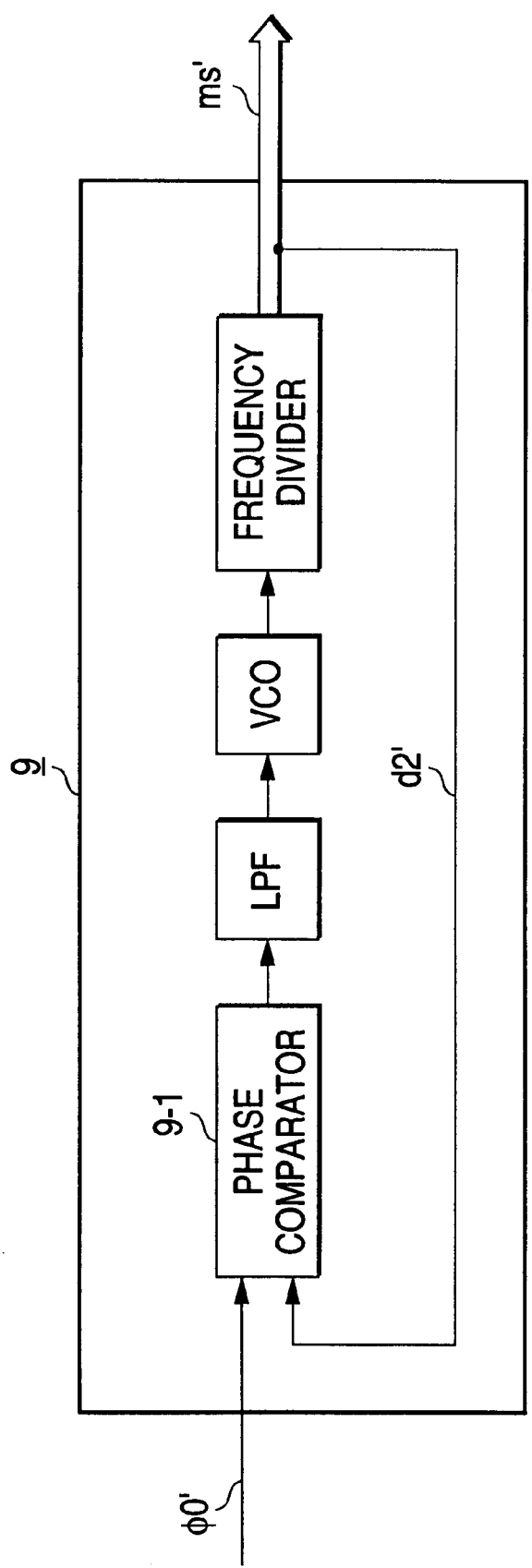
FIG. 12 is a block diagram of a PLL circuit 9 shown in FIG. 10.
Figure 13:
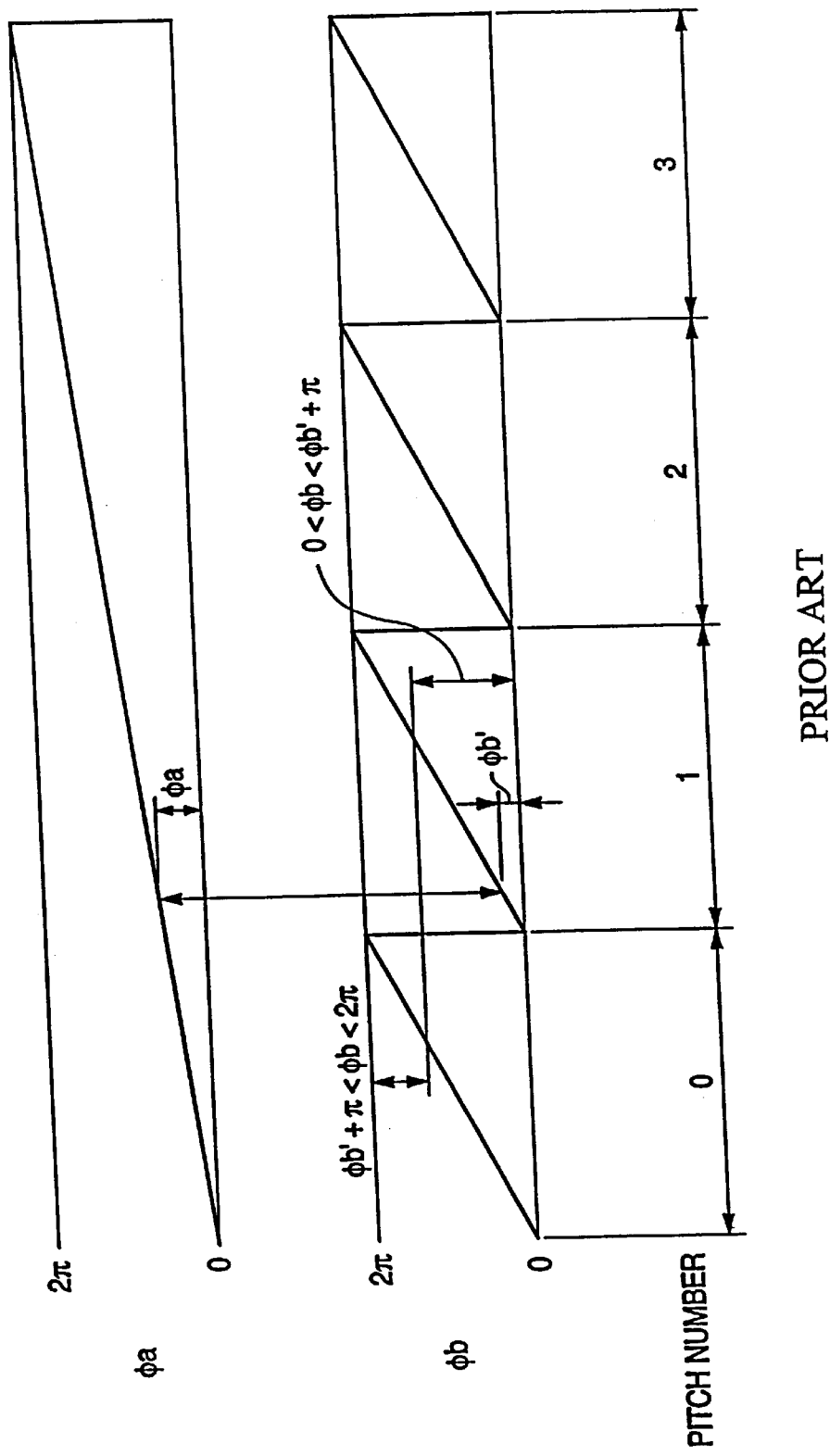
FIG. 13 is a schematic representation of the operation of an absolute encoder in a related art.

The carrier signal of the modulation circuit 4-1 for generating φ01' uses the signal ms' whose pitch changes in association with φ0' using the PLL circuit. FIG. 12 shows details of the PLL circuit. The PLL circuit 9 in FIG. 12 has the same configuration as the PLL circuit 10 in FIG. 9 and therefore will not be discussed again in detail. ms' is a three-bit binary signal and the bit d2' of the longest period becomes an input signal to a phase comparator 9-1 and is locked to φ0'.

If the phase of φ01' is placed in the lag direction with respect to the ms' signal in the above-mentioned rotation direction, the number of pitches of φ01' in the vernier pitch becomes the number of pitches of a1 subtracted from the number of pitches of φ0' in the pitch (=the number of pitches of ms'), namely, 13 (16−3).

Next, the detection gain of the digitized phase difference signal φ01 will be discussed.

The phase difference signal φ01 is read in synchronization with φ01' and the number of clocks between the rising edges of the reference signal φ and φ01' is counted for providing φ01. The number of clocks in one pitch of the reference signal φ corresponds to phase difference $2\pi$.

The difference between adjacent kth and (k+1)st read phase difference signals, $(\phi 01_{(k+1)} - \phi 01_{(k)})$ becomes as follows:

$\phi 01_{(k+1)} - \phi 01_{(k)} = 2\pi - (\text{pitch length of } \phi 01'/\text{pitch length of } \phi) \times 2\pi = 2\pi - (12/13) \times 2\pi = (1/13) \times 2\pi$ The number of pitches of φ01' in the vernier pitch is 13 and the phase difference in the vernier pitch becomes $(1/13) \times 2\pi \times 13 = 2\pi$.

It is seen that the phase difference signal φ01 correctly detects the phase difference between the main slit string 2-a0 and the auxiliary slit string 2-a1.

If the rotation disk rotates in an opposite direction to that in the embodiment, likewise it can be described that a detection gain error does not occur. For the digitized phase signal φ0 between the reference signal φ and the phase signal φ0', likewise it can be described that a detection gain error does not occur.

INDUSTRIAL APPLICABILITY

As described above, according to the invention, in an absolute encoder comprising a scale having a plurality of tracks different in the number of pitches where position information repeated at the same pitches is formed, a plurality of sensors for making a relative move to the scale for detecting the position information, a phase modulation section for converting signals from the sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, the phase signals φ0, φ1, φ2, φ3 . . . are represented by j-bit digital signals, the numbers of pitches a0, a1, a2, and a3 are set so that the number of pitches of the phase difference signal φ01 (a0−a1), the number of pitches of φ02 (a0−a2), and the number of pitches of φ03 (a0−a3) become a0/(a0−a1)=$2^{K1}$, (a0−a1)/(a0−a2)=$2^{K2}$, and (a0−a2)/(a0−a3)=$2^{K3}$ where K1, K2, and K3 are each an integer, φ0 is divided by $2^{K1}$, and an absolute value signal A01 of the number of pitches (a0−a1) with the high-order K1 bits of the signal provided by subtracting the signal that is provided by dividing φ0 by $2^{K1}$ from φ01 as high-order bits and φ0 as low-order bits is generated; likewise, an absolute value signal A02 is generated from A01 and the phase signal φ02, and the process is executed in order, whereby a longer-pitch absolute value signal is generated. Further, the absolute encoder is configured so that the phase $\pi$ point of φ0 becomes the phase zero point of φ01, that the phase $\pi$ point of A01 becomes the phase zero point of φ02, and that the phase $\pi$ point of A03 becomes the phase zero point of φ03. Thus, a low-cost, high-reliability absolute encoder hard to be affected by a phase error between slit strings caused by distortion of a detection waveform or the like by performing simple operation processing without requiring a determination processing function of a complicated computing element, etc., can be provided.

Further, according to the second embodiment, a phase adjustment signal is input to the shift register and is shifted based on an adjustment reference clock, each post-shifted phase adjustment signal is input to the multiplexer, the phase adjustment signal amount is selected through the switch, and the signal is used to generate a carrier wave of the phase modulation circuit. Thus, a mechanical error of work accuracy of each slit, assembly accuracy of the magnetic sensor, or the like is absorbed, occurrence of a phase difference signal error is eliminated, and a high-bit-count absolute encoder can be provided at low costs.

According to the third embodiment, the absolute encoder is provided with the PLL (phase-locked loop) circuit based on phase signal, generates a clock whose frequency changes in association with the period of the phase signal by the PLL circuit, and generates the phase difference signal based on the count of the clocks. Thus, the absolute encoder adaptable to high-speed rotation wherein a phase difference signal error does not occur even in high-speed rotation or a high-speed move of the scale can be provided.

According to the fourth embodiment, a phase signal obtained from one sensor, of two arbitrary sensor signals or a carrier wave generated from the phase signal is further phase-modulated by a signal from the other sensor, whereby a detection gain error of a phase difference detection signal does not occur in a high-speed move of the scale, so that an absolute encoder adaptable to high-speed rotation can be provided.

What is claimed is:

1. An absolute encoder comprising a scale having a plurality of tracks different in the number of pitches where position information repeated at the same pitches is formed, a plurality of sensors for making a relative move to said scale for detecting the position information, a phase modulation section for converting signals from said sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that when the phase signals $\phi 0, \phi 1, \phi 2, \phi 3 \ldots$ are j-bit digital signals represented as $\phi 0 = 2\pi a0x + b0$
$\phi 1 = 2\pi a1x + b1$
$\phi 2 = 2\pi a2x + b2$
$\phi 3 = 2\pi a3x + b3$
$\ldots$ where a0, a1, a2, a3, ... are each the number of pitches, x is relative displacement between scale and sensor, b0, b1, b2, b3, ... are each an initial phase, said absolute value signal generation section sets the numbers of pitches a0, a1, a2, a3 ... so that the number of pitches of phase difference signal $\phi 01$ between $\phi 0$ and $\phi 1$ (a0−a1), the number of pitches of phase difference signal $\phi 02$ between $\phi 0$ and $\phi 2$ (a0−a2), the number of pitches of phase difference signal $\phi 03$ between $\phi 0$ and $\phi 3$ (a0−a3)

$\ldots$ become $a0/(a0-a1) = 2^{K1}$
$(a0-a1)/(a0-a2) = 2^{K2}$
$(a0-a2)/(a0-a3) = 2^{K3}$
$\ldots$ where k1, k2, k3 ... are each an integer, divides $\phi 0$ by $2^{K1}$, generates an absolute value signal A01 of the number of pitches (a0−a1) with the high-order k1 bits of the signal provided by subtracting the signal that is provided by dividing $\phi 0$ by $2^{K1}$ from $\phi 01$ as high-order bits and $\phi 0$ as low-order bits, divides A01 by $2^{K2}$, generates an absolute value signal A02 of the number of pitches (a0−a2) with the high-order k2 bits of the signal provided by subtracting the signal that is provided by dividing A01 by $2^{K2}$ from $\phi 02$ as high-order bits and A01 as low-order bits, and executes the process in order, thereby generating a longer-pitch absolute value signal.

2. The absolute encoder as claimed in claim 1 wherein positions of the position information on said scale are formed or a phase adjustment circuit is provided so that a phase $\pi$ point of $\phi 0$ becomes a phase zero point of $\phi 01$, that a phase $\pi$ point of A01 becomes a phase zero point of $\phi 02$, and that a phase $\pi$ point of A02 becomes a phase zero point of $\phi 03$.

3. The absolute encoder as claimed in claim 2 wherein the phase adjustment circuit inputs a phase adjustment signal into a shift register, generates a plurality of phase adjustment signals different in shift amount with that phase adjustment signal shifted in order based on an adjustment reference clock, selects each post-shifted phase adjustment signal by a multiplexer, generates a carrier wave from the selected signal, and inputs the carrier wave into phase modulation section for making a phase adjustment of the phase signal.

4. An absolute encoder comprising a scale having a plurality of tracks different in the number of pitches where position information repeated at the same pitches is formed, a plurality of sensors for making a relative move to said scale for detecting the position information, a phase modulation section for converting signals from said sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that said digital conversion section inputs the phase signal into a PLL (phase-locked loop) circuit, generates a clock whose frequency is changed in association with a period of the phase signal by the PLL circuit, and generates the phase difference signal based on the count of the clocks.

5. An absolute encoder comprising a scale having a plurality of tracks different in the number of pitches where position information repeated at the same pitches is formed, a plurality of sensors for making a relative move to said scale for detecting the position information, a phase modulation section for converting signals from said sensors into phase signals, a digital conversion section for converting the phase signals and each phase difference signal between two arbitrary phase signals into digital signals, and an absolute value signal generation section for generating a signal concerning an absolute position based on the digitized phase signals and the digitized phase difference signals, characterized in that said phase modulation section has a phase modulation circuit for inputting the phase signal corresponding to an arbitrary sensor signal into a PLL (phase-locked loop) circuit and modulating a carrier wave generated by the PLL circuit based on another sensor signal, thereby generating phase difference signal.

* * * * *